US012767022B2

(12) United States Patent
Vachon et al.

(10) Patent No.: US 12,767,022 B2
(45) Date of Patent: Oct. 20, 2026

(54) RAISED SEATING SYSTEM FOR A PERSONAL WATERCRAFT

(71) Applicant: BOMBARDIER RECREATIONAL PRODUCTS INC., Valcourt (CA)

(72) Inventors: Marc Vachon, St-Denis-de-Brompton (CA); Simon Baldachino, Bromont (CA); Magali Bitsch, Saint-Francois-Xavier-de-Brompton (CA); Melissa Theberge, Stoke (CA); Carl Begin, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 252 days.

(21) Appl. No.: 18/788,346

(22) Filed: Jul. 30, 2024

(65) Prior Publication Data

US 2024/0383387 A1 Nov. 21, 2024

Related U.S. Application Data

(62) Division of application No. 17/584,704, filed on Jan. 26, 2022, now Pat. No. 12,077,077.

(60) Provisional application No. 63/142,742, filed on Jan. 28, 2021.

(51) Int. Cl.

| | |
|---|---|
| ***B63B 34/10*** | (2020.01) |
| ***B60N 2/02*** | (2006.01) |
| ***B60N 2/68*** | (2006.01) |
| ***B63B 29/04*** | (2006.01) |

(52) U.S. Cl.
CPC ................. *B60N 2/68* (2013.01); *B60N 2/02* (2013.01); *B63B 34/10* (2020.02); *B60N 2002/022* (2013.01); *B60N 2002/684* (2013.01); *B63B 2029/043* (2013.01)

(58) Field of Classification Search
CPC .......................... B63B 34/10; B63B 2029/043
See application file for complete search history.

(56) References Cited

U.S. PATENT DOCUMENTS

| | | | | |
|---|---|---|---|---|
| 6,145,458 | A | 11/2000 | Hattori | |
| 7,128,014 | B2 | 10/2006 | Berthiaume et al. | |
| 7,571,692 | B2 | 8/2009 | Kreger | |
| 8,260,535 | B2 | 9/2012 | Dagenais | |
| 8,577,588 | B2 | 11/2013 | Dagenais | |
| 9,020,744 | B2 | 4/2015 | Dagenais | |
| 10,214,270 | B1 * | 2/2019 | Berche .................... | B63B 34/10 |
| 10,336,387 | B2 | 7/2019 | Lacasse-Jobin et al. | |
| 11,353,913 | B2 * | 6/2022 | Ploch ....................... | G05G 1/04 |
| 11,753,119 | B1 | 9/2023 | Witte et al. | |

(Continued)

*Primary Examiner* — Andrew Polay
(74) *Attorney, Agent, or Firm* — BCF LLP

(57) ABSTRACT

A personal watercraft includes a hull, a deck disposed on the hull and a seat assembly supported on the deck. The deck is disposed on the hull. The seat assembly includes a seat portion, a backrest and a blocking system. The seat portion is selectively connected to the deck. The backrest is selectively connected to the seat portion. The blocking system is operatively connected to the seat portion, and has a first configuration permitting connection of the seat portion to the deck in response to the backrest being disconnected from the seat portion, and a second configuration preventing connection of the seat portion to the deck in response to the backrest being connected to the seat portion.

9 Claims, 25 Drawing Sheets

(56) References Cited

U.S. PATENT DOCUMENTS

| | | | | |
|---|---|---|---|---|
| 2002/0073910 | A1* | 6/2002 | Yamada | B63B 29/04 114/363 |
| 2010/0178815 | A1 | 7/2010 | Leblanc | |
| 2020/0198499 | A1 | 6/2020 | Jang et al. | |
| 2021/0237832 | A1* | 8/2021 | Begin | B63B 34/10 |
| 2022/0315172 | A1 | 10/2022 | Champagne et al. | |

* cited by examiner

RAISED SEATING SYSTEM FOR A PERSONAL WATERCRAFT

CROSS-REFERENCE TO RELATED APPLICATION

The present application is a divisional application of U.S. patent application Ser. No. 17/584,704, filed on Jan. 26, 2022, which claims priority to U.S. Provisional Patent Application No. 63/142,742, filed Jan. 28, 2021 entitled "Raised Seating System for a Personal Watercraft", both of which are incorporated by reference herein in their entireties.

FIELD OF THE TECHNOLOGY

The present technology relates to personal watercrafts.

BACKGROUND

It is known to provide a personal watercraft with a portion of the seat that can be raised for a user to sit thereon, for example while fishing. U.S. Pat. No. 7,571,692 B2, entitled "Personal Watercraft And Seat Assemblies Therefor" and issued on Aug. 11, 2009, describes such a personal watercraft with a seat assembly having a rear seat portion of the straddle seat of the personal watercraft being mounted on a movable support post.

However, it would be desirable to provide such a reconfigurable seat assembly while preventing the use of the seat portion in the raised position with the personal watercraft being operated above a certain speed.

Furthermore, the seat assembly described in U.S. Pat. No. 7,571,692 B2 lacks a backrest which would provide more comfort when in the raised position. It would therefore be desirable to provide a reconfigurable seat assembly for a personal watercraft that would permit connection of a backrest thereto when in the raised position.

SUMMARY

It is an object of the present technology to ameliorate at least some of the inconveniences present in the prior art.

According to one aspect of the present technology, there is provided a personal watercraft including a hull, a deck disposed on the hull, a motor disposed between the hull and the deck, a propulsion system operatively connected to the motor, a motor control unit operatively connected to the motor for controlling at least one parameter associated with the motor, a seat assembly supported on the deck, the seat assembly including a seat portion being selectively connected to the deck, a seat support selectively connected to the deck, the seat support selectively supporting the seat portion above the deck, a sensor connected to at least one of the hull and the deck, the sensor communicating with the motor control unit, and in response to the seat support being connected to the deck, the sensor detecting a presence of the seat support, and in response to the sensor detecting the presence of the seat support, the motor control unit limiting at least one of the at least one parameter associated with the motor.

In some implementations, the at least one parameter associated with the motor includes a motor speed, a motor torque and a speed of the personal watercraft.

In some implementations, in response to the sensor detecting the presence of the seat support, the motor control unit limits the speed of the personal watercraft.

In some implementations, the deck defines an anchor aperture, and the seat support has a lower portion selectively inserted in the anchor aperture.

In some implementations, the seat support includes a magnet connected to the lower portion, and the sensor is a Hall-effect sensor operable for detecting the magnet in response to the lower portion being inserted in the anchor aperture.

In some implementations, the sensor is connected to the deck and is located below the anchor aperture.

In some implementations, the lower portion of the seat support includes a retaining system for securing the seat support to the deck.

In some implementations, the retaining system includes at least one tab adapted to selectively engage the deck of the personal watercraft.

In some implementations, the lower portion of the seat support is selectively inserted in the anchor aperture in either one of a first orientation and a second orientation.

In some implementations, the seat portion is a rear seat portion of the seat assembly.

In some implementations, the rear seat portion has a base and a cushion disposed on top of the base, and the base being selectively connected to the deck.

In some implementations, the base defines a seat support aperture adapted to receive an upper portion of the seat support.

In some implementations, the seat portion is pivotally connected to the seat support.

In some implementations, the deck defines a pedestal, and the seat portion is connected to either one of the pedestal and the seat support.

In accordance with another aspect of the present technology, there is provided a raised seating system for a personal watercraft having a hull, a deck disposed on the hull, a motor disposed between the hull and the deck, and a motor control unit operatively connected to the motor for controlling at least one parameter associated with the motor. The raised seating system includes a seat support having a lower portion and an upper portion, the lower portion being configured for being selectively connected to the deck of the personal watercraft, and the upper portion being configured for being selectively connected to a seat portion of the personal watercraft, a sensor configured for being connected to at least one of the hull and the deck of the personal watercraft and for communicating with the motor control unit of the personal watercraft such that in response to the lower portion of the seat support being connected to the deck, the sensor detecting a presence of the seat support, and in response to the sensor detecting the presence of the seat support, the sensor sending a signal to the motor control unit for limiting at least one of the at least one parameter associated with the motor.

In some implementations, the raised seating system further includes the seat portion, and the seat portion has a base and a cushion disposed on top of the base, and the base defines a seat support aperture adapted to receive the upper portion of the seat support.

In some implementations, the raised seating system further includes a magnet connected to the lower portion of the seat support.

In some implementations, the lower portion of the seat support is configured for being selectively inserted in an anchor aperture defined in the deck of the personal watercraft.

In some implementations, the lower portion of the seat support is configured for being selectively inserted in the anchor aperture in either one of a first orientation and a second orientation.

In some implementations, the lower portion of the seat support further includes a retaining system for securing the seat support to the deck of the personal watercraft.

In some implementations, the retaining system includes at least one tab adapted to selectively engage the deck of the personal watercraft.

In some implementations, at least one of the upper portion and the lower portion of the seat support is at least partially filled with a foam.

In some implementations, the upper portion of the seat support is configured for pivotally connecting the seat portion.

In some implementations, the raised seating system further includes a backrest being selectively connected to the seat portion when the seat portion is selectively connected to the upper portion of the seat support.

In accordance with yet another aspect of the present technology, there is provided a method for adjusting performance of a personal watercraft having a motor, and a motor control unit operatively connected to the motor for controlling at least one parameter associated with the motor. The method includes detecting a presence of the seat support connected to a deck of the personal watercraft, and in response to detecting the presence of the seat support, limiting at least one of the at least one parameter associated with the motor.

In some implementations, the at least one parameter associated with the motor includes a motor speed, a motor torque and a speed of the personal watercraft.

In some implementations, in response to detecting the presence of the seat support, the motor control unit limits the speed of the personal watercraft.

In some implementations, the method further includes connecting the seat support to the deck.

In some implementations, the method further includes removing a seat portion from a pedestal of the personal watercraft, and connecting the seat portion to the seat support.

In some implementations, the method further includes connecting a backrest to the seat portion after removing the seat portion from the pedestal.

In accordance with yet another aspect of the present technology, there is provided a personal watercraft including a hull, a deck disposed on the hull, a seat assembly supported on the deck, the seat assembly including a seat portion selectively connected to the deck, a backrest selectively connected to the seat portion, and a blocking system operatively connected to the seat portion. The blocking system has a first configuration permitting connection of the seat portion to the deck in response to the backrest being disconnected from the seat portion, and a second configuration preventing connection of the seat portion to the deck in response to the backrest being connected to the seat portion.

In some implementations, the seat portion includes a base and a cushion disposed on top of the base.

In some implementations, one of the deck and the base has at least one peg, another one of the deck and the base has at least one latch, and the at least one latch is configured to selectively connect to the at least one peg for connecting the seat portion to the deck.

In some implementations, the blocking system includes a blocking member. In response to the blocking system being in the first configuration, the blocking member is in a first position permitting the connection of the seat portion to the deck, and in response to the blocking system being in the second configuration, the blocking member is in a second position preventing the connection of the seat portion to the deck.

In some implementations, in the first position, the blocking member is retracted in the base of the seat portion.

In some implementations, in the second position, the blocking member extends outward of the base of the seat portion for abutting the deck and preventing the seat portion from being selectively connected to the deck.

In some implementations, the backrest has at least one backrest arm, and the base includes at least one channel adapted for receiving the at least one backrest arm therein, the at least one backrest arm pushing the blocking member towards the second position when received in the at least one channel.

In some implementations, the blocking member translates between the first position and the second position along a blocking member axis, the at least one backrest arm extends along an arm axis, and an angle defined between the blocking member axis and the arm axis is included between 120 and 170 degrees.

In some implementations, the arm axis is laterally offset from the blocking member axis.

In some implementations, the blocking system further includes a transverse member connected to the blocking member, the transverse member extending in the at least one channel when the blocking member is in the first position.

In some implementations, the transverse member and the blocking member are integrally formed.

In some implementations, the blocking system further includes a spring connected between the base and the blocking member, the spring biasing the blocking member toward the first position.

In some implementations, the blocking system is biased toward the first configuration.

For purposes of this application, terms related to spatial orientation such as forwardly, rearward, upwardly, downwardly, left, and right, are as they would normally be understood by an operator of the vehicle sitting thereon in a normal riding position. Terms related to spatial orientation when describing or referring to components or sub-assemblies of the vehicle, separately from the vehicle, such as a deck or hull for example, should be understood as they would be understood when these components or sub-assemblies are mounted to the vehicle, unless specified otherwise in this application. The term "straddle seat" refers to a seat on which a person normally sits astride. The term "motor" can refer to any component capable of providing power to a propulsion system of a watercraft, which includes but is not limited to an internal combustion engine or an electric motor.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present detailed description is intended to be a description of illustrative examples of the present technology. Although described with respect to a jet-propelled personal watercraft, other propulsion systems are contemplated.

Figure 1:
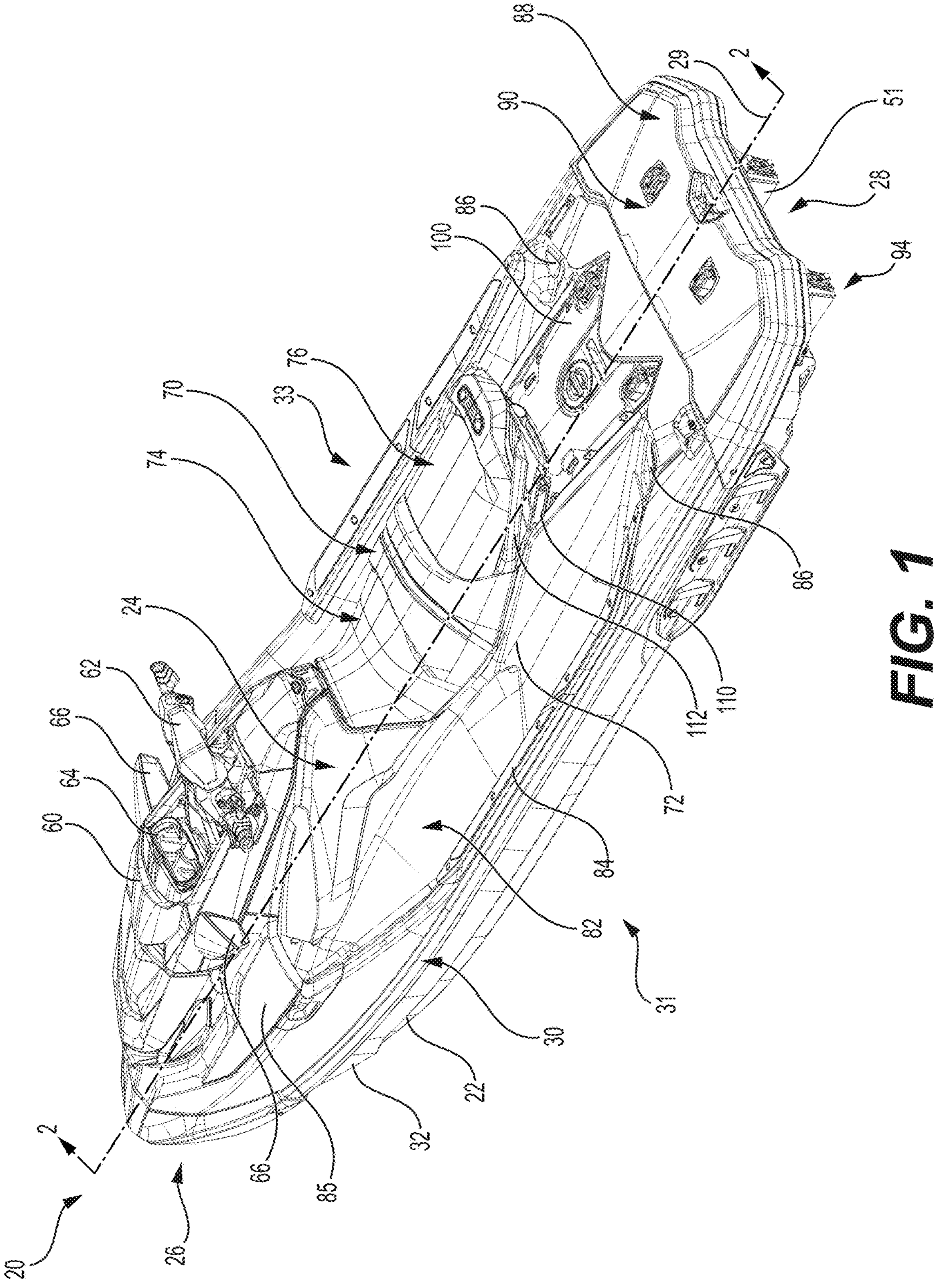
FIG. 1 is a perspective view taken from a top, rear, left side of a personal watercraft according to the present technology.

Referring to FIGS. 1 to 4, an implementation of a personal watercraft 20 will be described. The personal watercraft 20 has a hull 22 and a deck 24. It is contemplated that any suitable material could be used to make the hull 22 and the deck 24. The hull 22 buoyantly supports the watercraft 20 in the water. The hull 22 has a bow 26 and a stern 28. A longitudinal centerline 29 extends between the bow 26 and the stern 28 and splits the deck 24 into a left longitudinal side 31 and a right longitudinal side 33 (FIG. 1). For the purpose of the following description, the components that are qualified as "left" or "right" are positioned on the corresponding left longitudinal side 31 and right longitudinal side 33 of the deck 24, unless mentioned otherwise.

The deck 24 is designed to accommodate an operator and two passengers, collectively referred to as riders. It is contemplated that the deck 24 could be designed to accommodate just one passenger or more than two passengers. The hull 22 and the deck 24 are joined together at a seam 30 that joins the parts in a sealing relationship. The seam 30 comprises a bond line formed by an adhesive. Other known joining methods could be used to sealingly engage the parts together, including but not limited to thermal fusion, molding or fasteners such as rivets, bolts or screws. A bumper 32 generally covers the seam 30. The bumper 32 helps to prevent damage to the outer surface of the watercraft 20 when the watercraft 20 is docked, for example. The bumper 32 can extend around the bow 26 and the stern 28, as shown, or around any portion or the entire seam 30.

Figure 2:
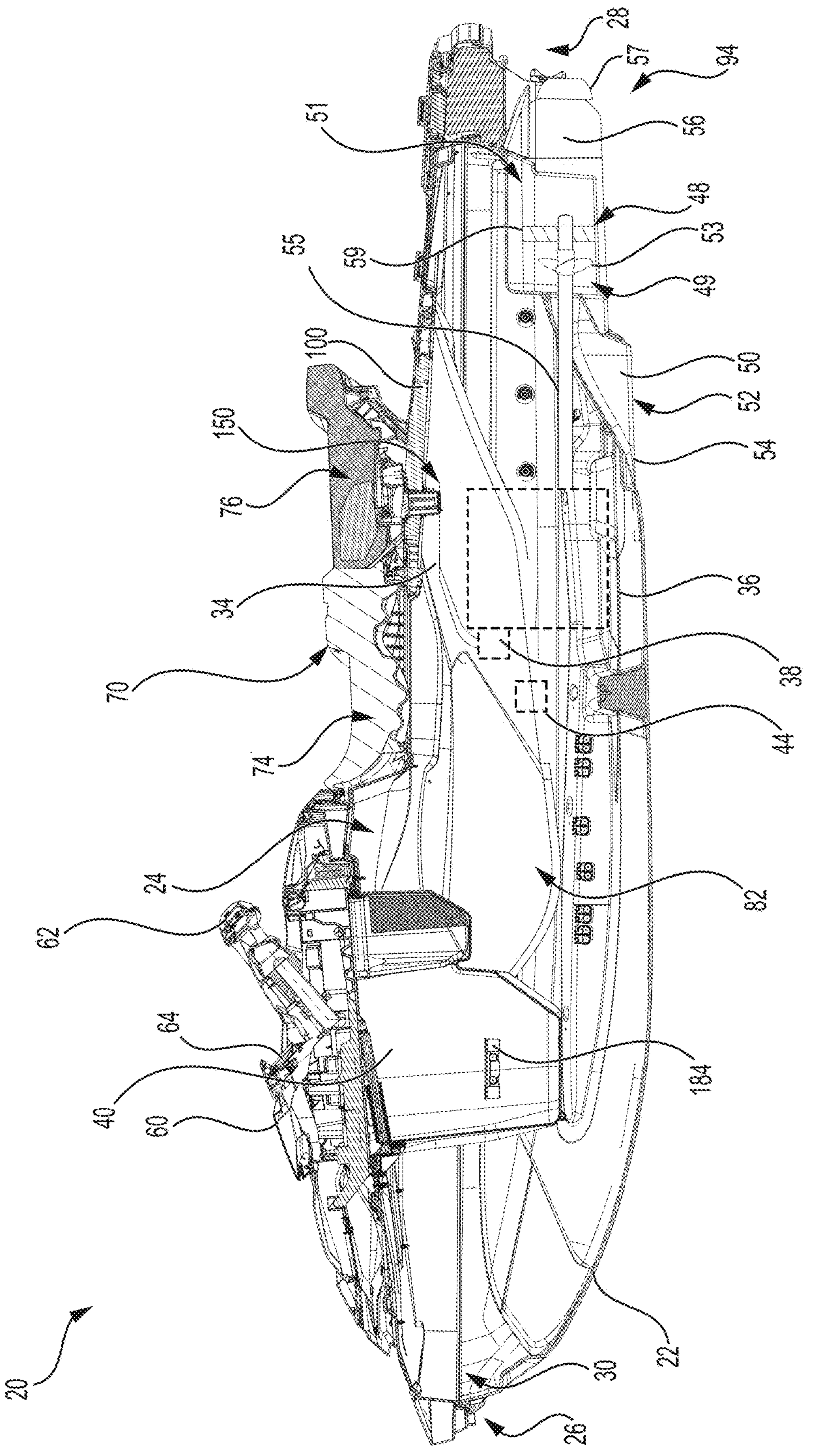
FIG. 2 is a longitudinal cross-sectional view of the personal watercraft of FIG. 1 taken along cross-section line 2-2 of FIG. 1.

The space between the hull 22 and the deck 24 forms a volume commonly referred to as the motor compartment 34 (FIG. 2). The motor compartment 34 accommodates a motor 36 (schematically shown in FIG. 2) in the form of an internal combustion engine. It is contemplated that the motor 36 could be an electric motor in other implementations. A motor control unit 38 (schematically shown in FIG. 2) communicates with the motor 36 for controlling the operation of the motor 36 in accordance with various parameters associated with the motor 36. These parameters include, but are not limited to, a motor speed, a motor torque, and a speed of the personal watercraft 20. The motor compartment 34 also accommodates a storage bin 40, an electrical system including a battery 44 schematically shown in FIG. 2, and other elements required or desirable in the personal watercraft 20. The motor 36 drives a water jet propulsion system 48 of the personal watercraft 20, although other types of propulsion systems are contemplated in other implementations.

The hull 22 defines part of an intake ramp 50 extending from an inlet 52 to a jet pump 49 of the jet propulsion system 48. The intake ramp 50 allows passage of water from underneath the hull 22, through the inlet 52 defined on the bottom 54 of the hull 22, and into the jet pump 49. The jet pump 49 is located in a formation in the hull 22, referred to as the tunnel 51. The tunnel 51 is defined at the front, sides, and top by the hull 22 and is open at a transom 94. The bottom of the tunnel 51 is closed by a ride plate (not shown) creating a surface on which the personal watercraft 20 rides or planes at high speeds.

Referring to FIG. 2, the jet pump 49 has an impeller 53 and a stator 59. The impeller 53 is coupled to the motor 36 by one or more shafts 55, such as a driveshaft and an impeller shaft. The rotation of the impeller 53 pressurizes the water, which then moves over the stator 59 that is made of a plurality of fixed stator blades (not shown). The role of the stator blades is to decrease the rotational motion of the water so that energy given to the water is used for thrust, as opposed to swirling the water. Once the water leaves the jet pump 49, it goes through a venturi 56. Since the exit diameter of the venturi 56 is smaller than its entrance diameter, the water is accelerated further, thereby providing more thrust. A steering nozzle 57 is pivotally attached to the venturi 56 so as to pivot about a vertical axis (not shown) to steer the watercraft 20. It is contemplated that the steering nozzle 57 could also pivot about a horizontal axis so as to adjust a trim of the watercraft 20. The steering nozzle 57 could also be supported at the exit of the tunnel 51 in other ways without a direct connection to the venturi 56. Moreover, the steering nozzle 57 can be replaced by a rudder or other diverting mechanism disposed at the exit of the tunnel 51 to selectively direct the thrust generated by the water jet propulsion system 48 to effect turning.

The steering nozzle 57 is operatively connected to a helm assembly 62 via a push-pull cable (not shown) such that when the helm assembly 62 is turned, the steering nozzle 57 pivots. This movement redirects the pressurized water coming from the venturi 56, so as to redirect the thrust and steer the personal watercraft 20 in the desired direction.

Still referring to FIGS. 1 to 4, towards the bow 26, the deck 24 has a hood 60, the helm assembly 62 and an instrument cluster 64. A hinge (not shown) is attached between the hood 60 and the front of the deck 24 to allow the hood 60 to move to an open position to provide access to the storage bin 40. A latch (not shown) locks the hood 60 into a closed position. When in the closed position, the hood 60 prevents water from entering the storage bin 40. Left and right rear view mirrors 66 are positioned on corresponding left and right sides of the hood 60 to allow the operator to see behind the watercraft 20.

Figure 5:
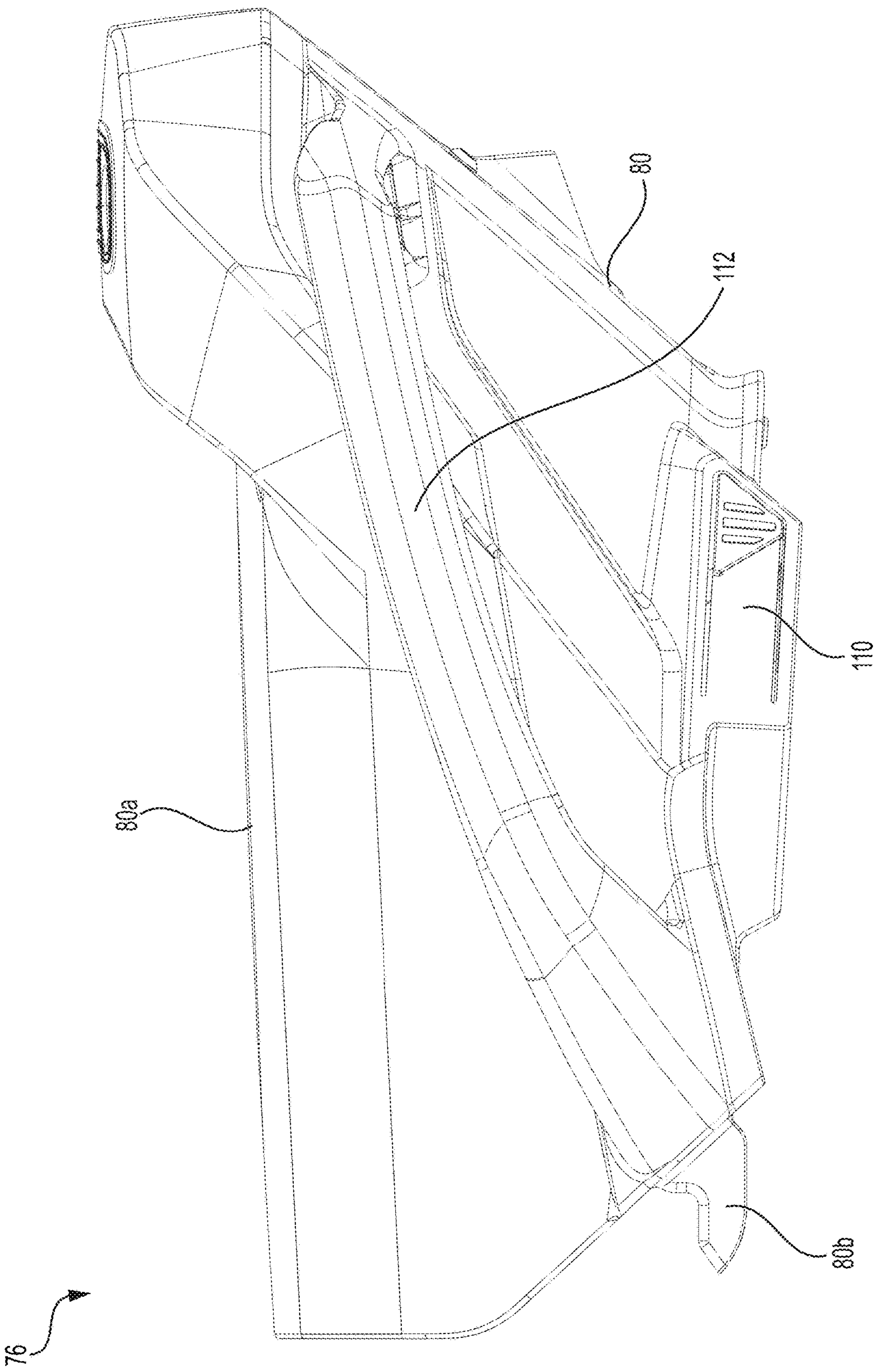
FIG. 5 is a left side elevation view of the rear seat portion of the personal watercraft FIG. 1.
Figure 6:
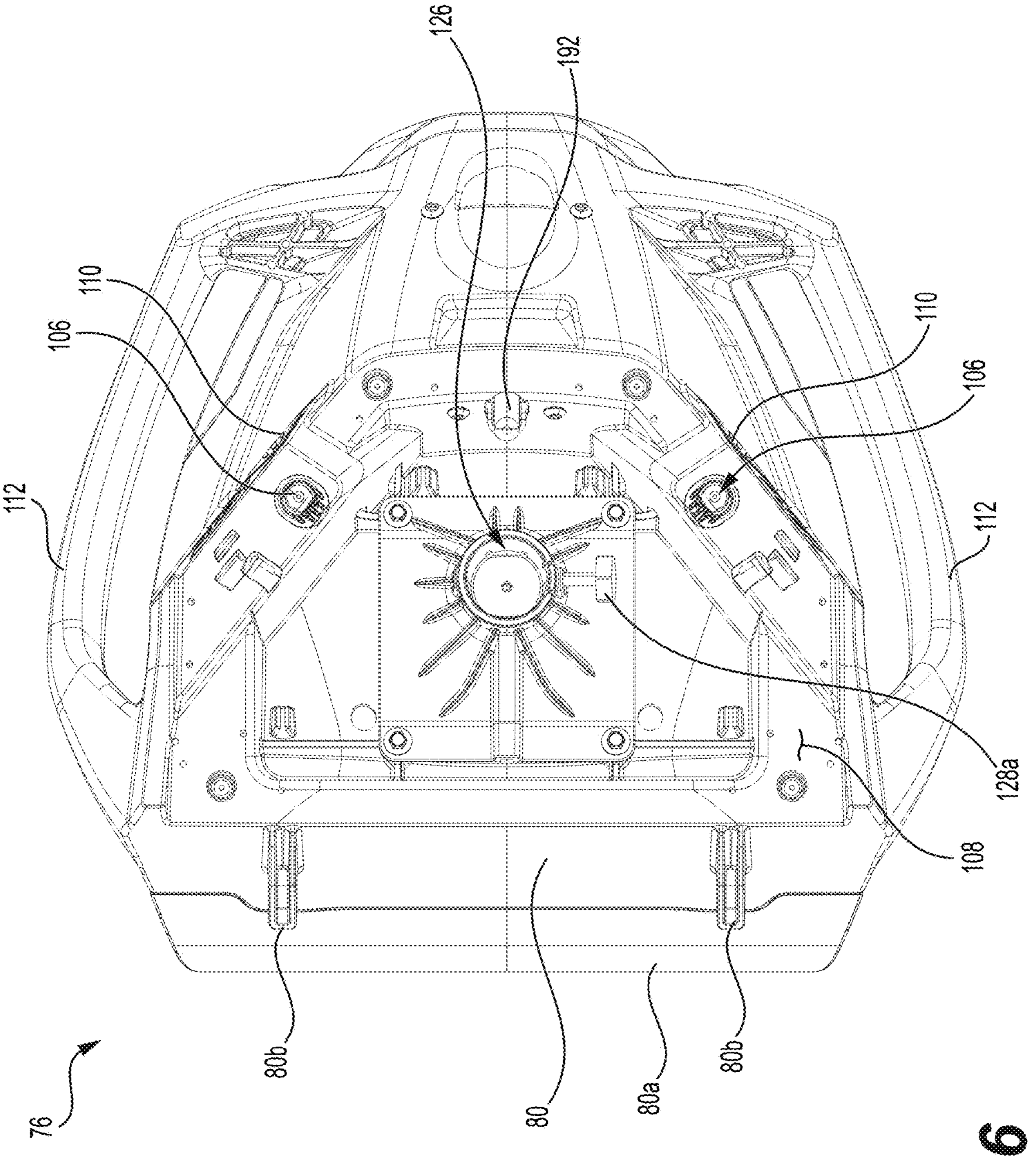
FIG. 6 is a bottom plan view of the rear seat portion of FIG. 5.
Figure 7:
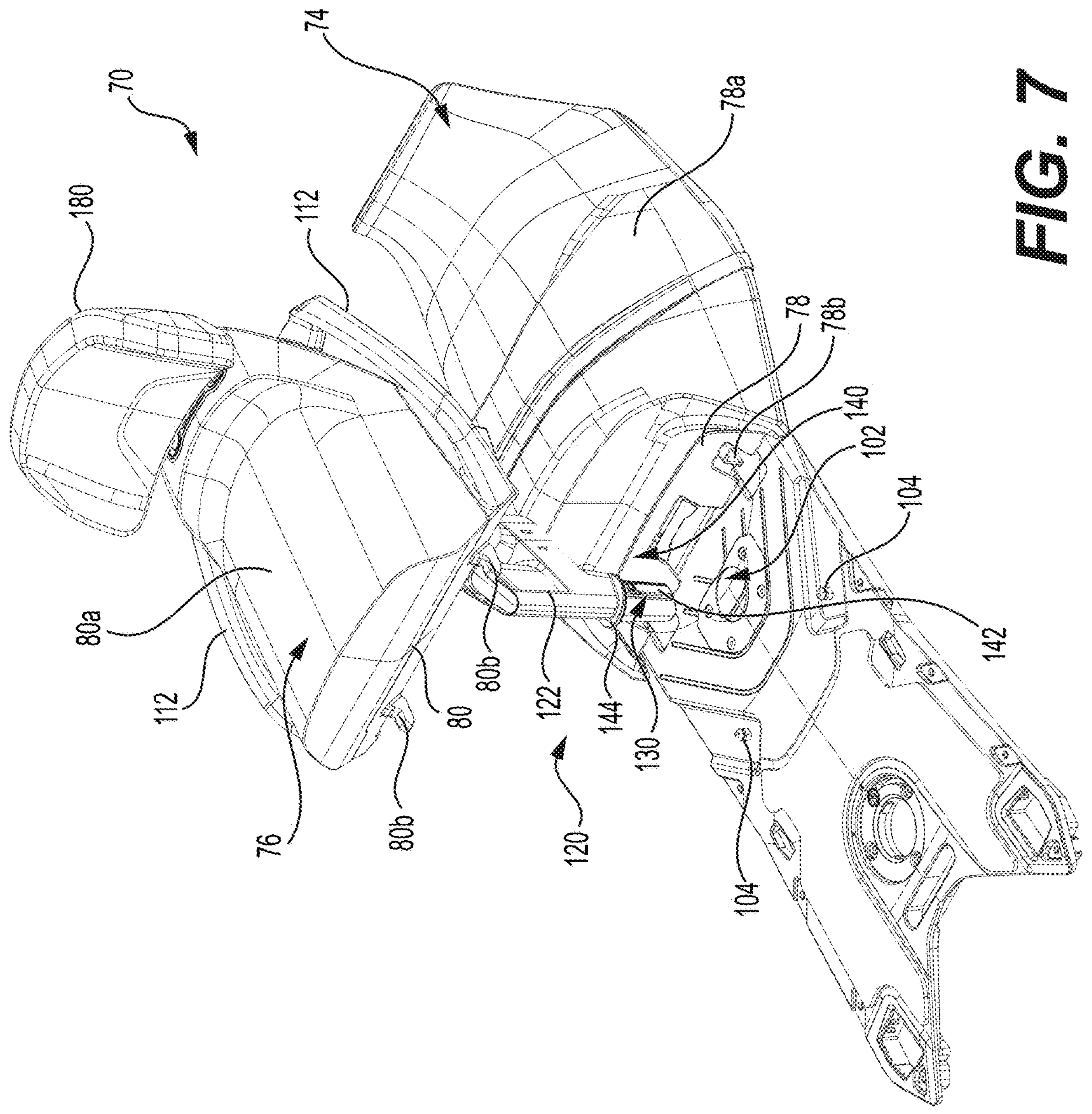
FIG. 7 is a perspective view taken from a top, rear, right side of a portion of the deck of the personal watercraft of FIG. 1, with the rear seat portion selectively connected to a seat support and with the seat support being disposed above an anchor aperture.
Figure 8:
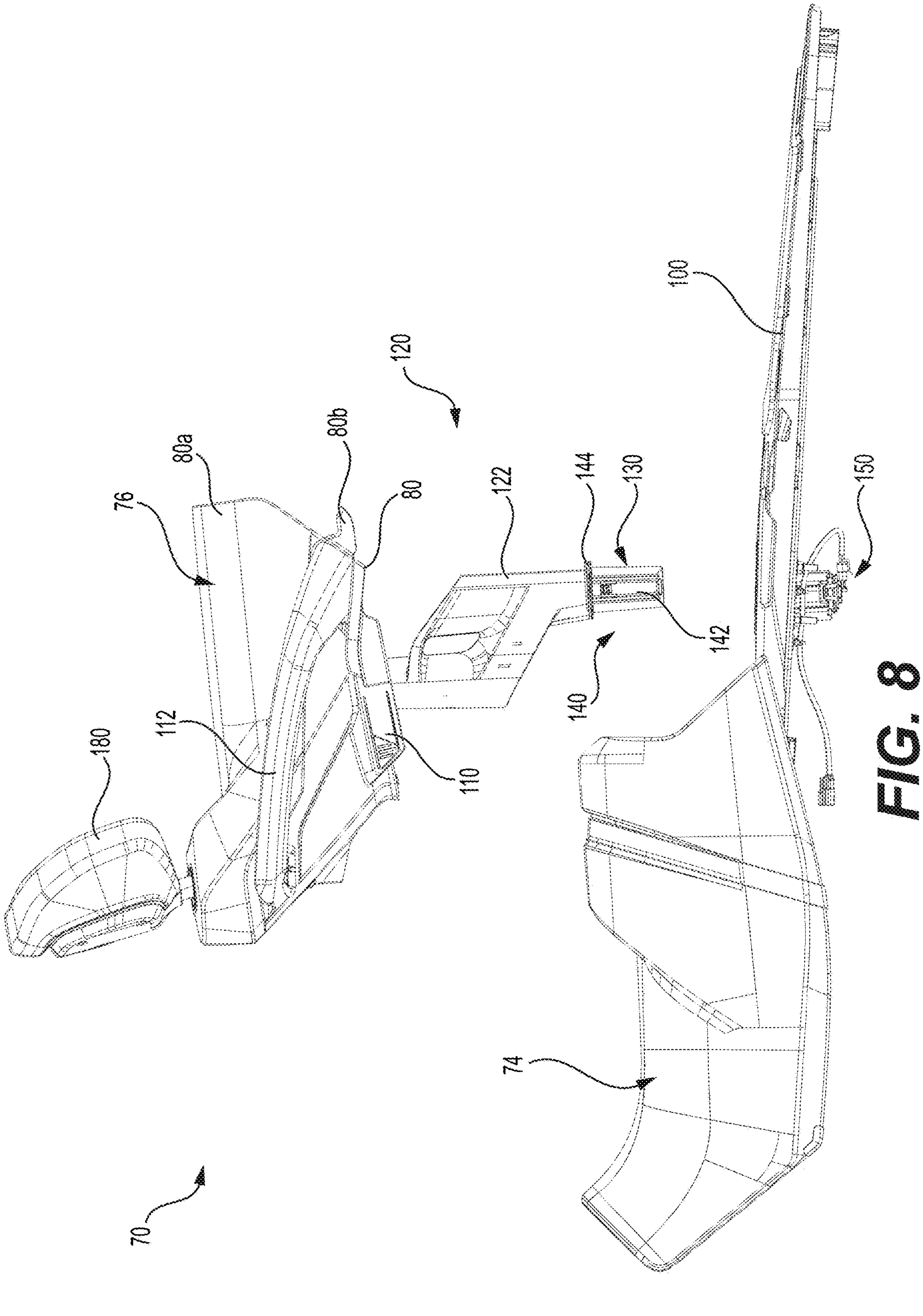
FIG. 8 is a left side elevation view of the portion of the deck of the personal watercraft, rear seat portion and seat support of FIG. 7.
Figure 9:
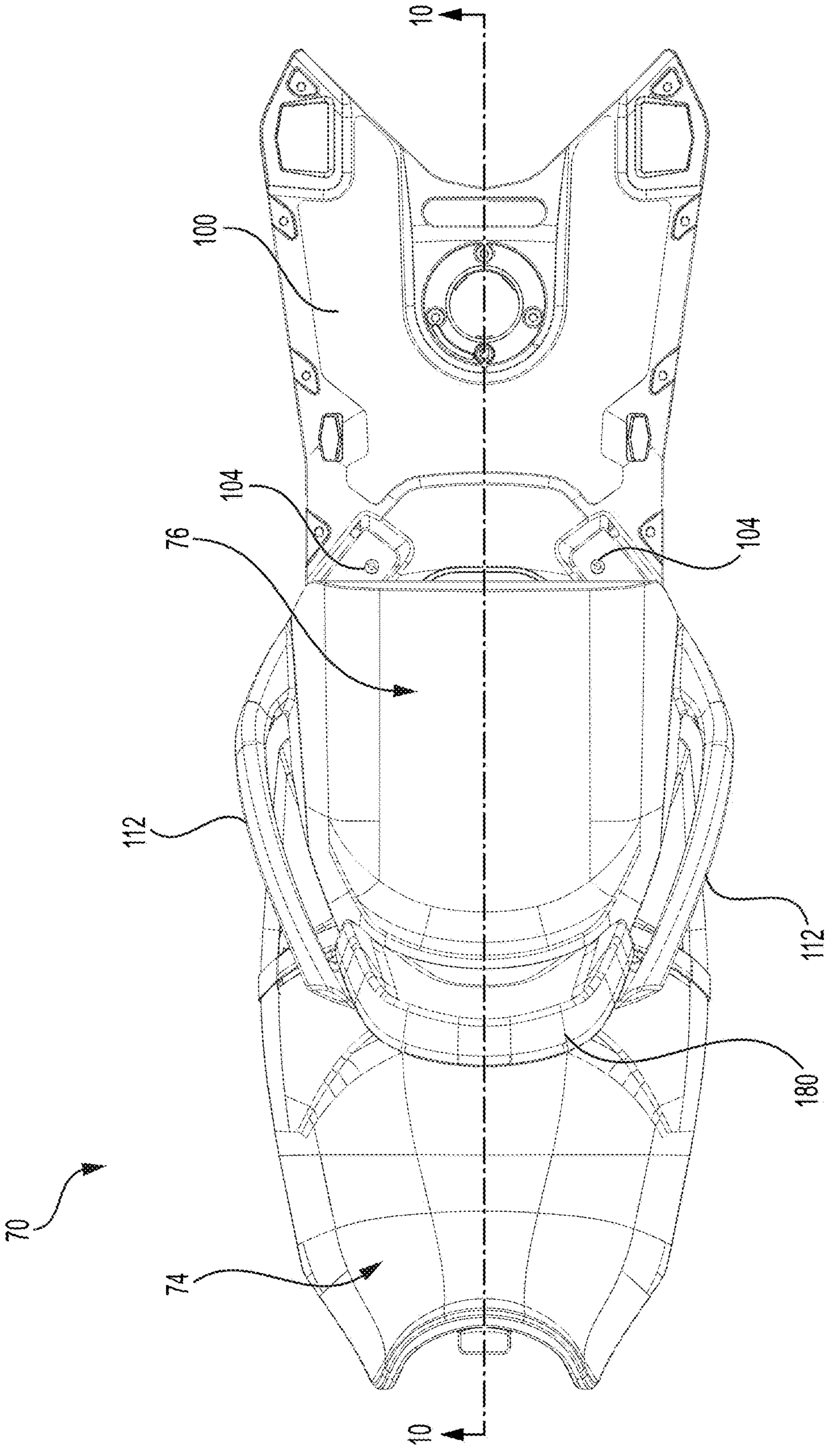
FIG. 9 is a top plan view of the portion of the deck of the personal watercraft, rear seat portion and seat support of FIG. 7.

Still referring to FIGS. 1 to 4, the deck 24 has a centrally positioned straddle-type seat assembly 70 supported on top of a pedestal 72 formed by the deck 24. Accordingly, the seat assembly 70 and the pedestal 72 are aligned with the longitudinal centerline 29 of the deck 24. The seat assembly 70 accommodates three riders in a straddling position. The seat assembly 70 has a front seat portion 74 and rear seat portion 76 made as cushioned or padded units. The front seat portion 74 has a front base 78 and the rear seat portion 76 has a rear base 80 (FIGS. 5, 6 and 8). The front base 78 and the rear base 80 are interfitting and are selectively connected to the deck 24 as best seen in FIG. 2. As best seen in FIG. 7, a cushion 78*a* is disposed on top of the front base 78 and a cushion 80*a* is disposed on top of the rear base 80. The front base 78 further defines left and right tongue recesses 78*b* in which left and right tongues 80*b* projecting from a front face of the rear base 80 are received when the front and rear bases 78, 80 are interfitted.

Figure 3:
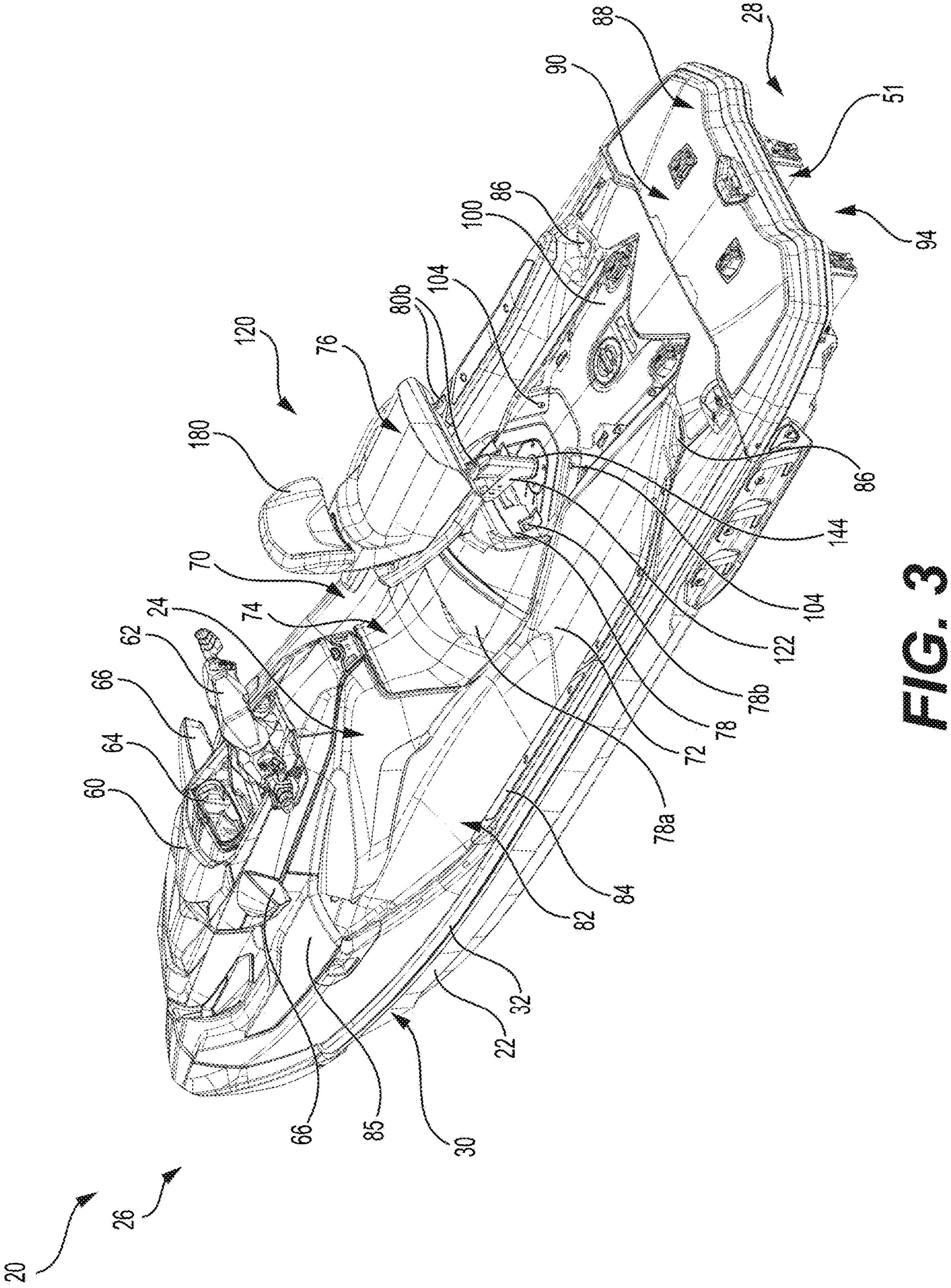
FIG. 3 is a perspective view taken from a top, rear, left side of the personal watercraft of FIG. 1, with a rear seat portion thereof selectively connected to a raised seating system according to the present technology.

Referring to FIGS. 1 to 3, on the left and right sides of the pedestal 72, the deck 24 forms footwells 82 that provide support for the riders' feet. Along the footwells 82, the watercraft 20 has a pair of generally upwardly extending walls located on either side of the watercraft 20 known as gunwales or gunnels 84. The gunnels 84 help to prevent the entry of water in the footwells 82 of the watercraft 20, provide lateral support for the riders' feet, and also provide buoyancy when turning the watercraft 20, since the personal watercraft 20 can roll slightly when turning. Towards the bow 26, fairings 85 extend between the gunnels 84 and the hood 60 and further prevent the entry of water in the footwells 82. Towards the stern 28, the gunnels 84 extend inwardly to act as heel rests 86. A passenger riding the watercraft 20 and sitting on the seat 70 facing towards the rear may place his or her heels on the heel rests 86, thereby providing a more stable riding position when acting as spotter for a skier, tuber or the like. It is contemplated that the heel rests 86 could also be formed separately from the gunnels 84. Forward of a rear end 88 of the deck 24, the deck 24 includes a reboarding platform 90 allowing a rider to easily reboard the watercraft 20 from the water. The reboarding platform 90 extends longitudinally between the transom 94 of the personal watercraft 20 and the heel rests 86. The reboarding platform 90 extends laterally over a width of the deck 24, between the left side 31 and the right side 33 of the deck 24.

A deck panel 100 extends forward of the reboarding platform 90. The deck panel 100 is removably connected to the deck 24 for allowing access to a portion of the motor compartment 34 when removed. It is contemplated that the deck panel 100 could be integrally formed with the rest of the deck 24 in other implementations. The deck panel 100 supports at least partially the front seat portion 74 and the rear seat portion 76. U.S. Pat. No. 10,214,270 B1, entitled "Personal Watercraft" and issued on Feb. 26, 2019, which is incorporated herein by reference in its entirety, describes the details of a connection of the front and rear seat portion 74, 76 with the deck panel 100. An anchor aperture 102 (FIG. 7) is defined in the deck panel 100 and is accessible when the rear seat portion 76 is removed from the deck panel 100. Left and right pegs 104 (FIGS. 3 and 7) project upwardly from the deck panel 100. The pegs 104 are configured to connect to corresponding left and right downwardly facing latches 106 provided on a bottom face 108 of the rear base 80 of the rear seat portion 76 (FIG. 6). The rear base 80 also includes left and right buttons 110 that are part of the corresponding left and right latches 106. When pressed, each one of the buttons 110 releases the corresponding left and right latch 106 respectively from the corresponding left and right peg 104 for selectively disconnecting the rear seat portion 76 from the deck panel 100. It is contemplated that in other implementations, the latches 106 could be provided on the deck panel 100 and the pegs 104 could be provided on the rear seat portion 76. Left and right grab handles 112 are connected to the corresponding left and right lateral sides of the rear base 80. The left and right grab handles 112 are configured to provide a handle onto which the one or more passengers of the personal watercraft 20 may hold, or manipulate the rear seat portion 76 when disconnected from the deck panel 100.

Figure 4:
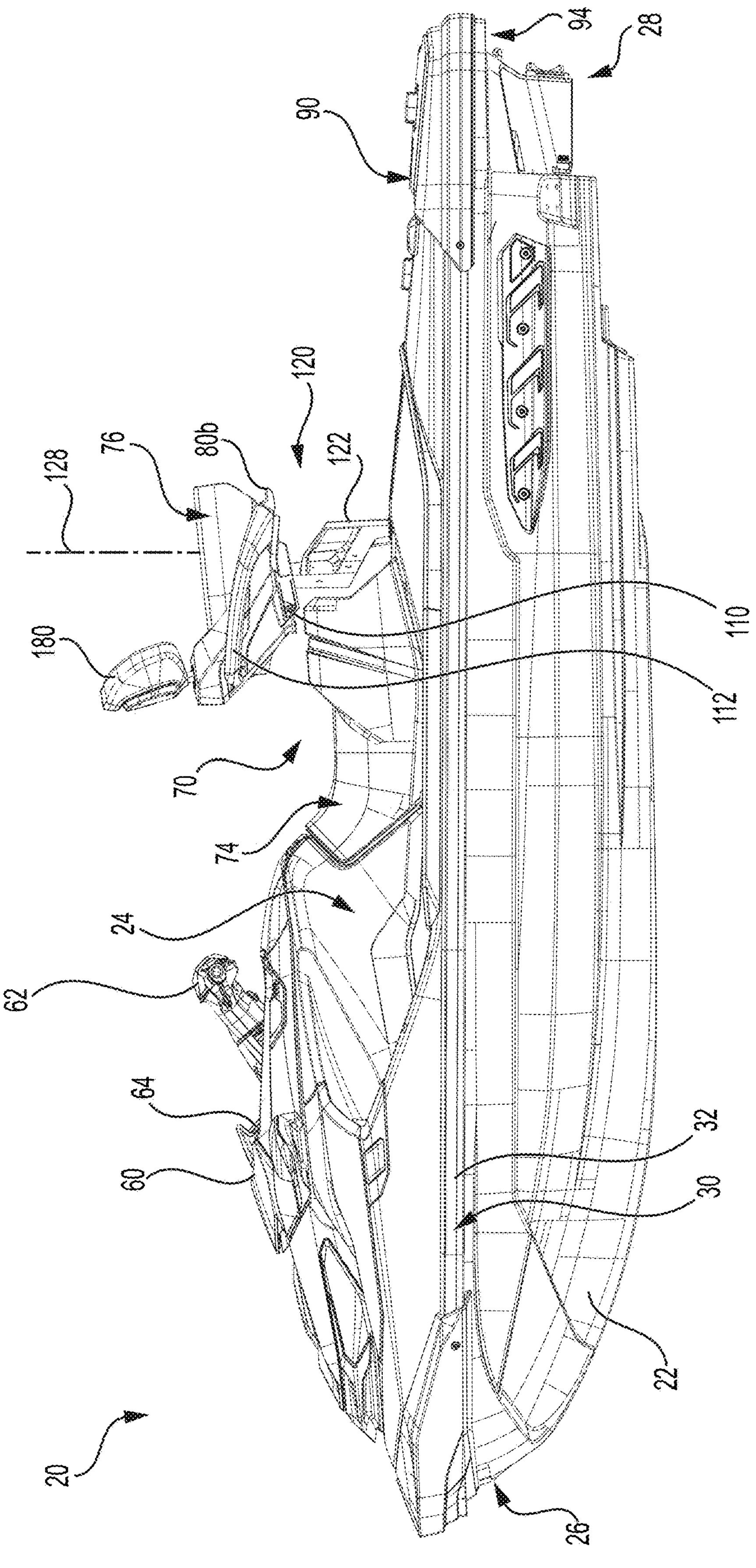
FIG. 4 is a left side elevation view of the personal watercraft of FIG. 3.

Referring to FIGS. 3 and 4, the personal watercraft 20 further has a raised seating system 120. The raised seating system 120 includes a seat support 122 selectively connected to the deck 24, and a backrest 180 selectively connected to the rear seat portion 76. The backrest 180 will be described in more detail below. The seat support 122 selectively supports the rear seat portion 76 above the deck 24, and in particular above the deck panel 100. The raised seating position provided by the seat support 122 and the backrest 180 provide comfort and flexibility to a user of the personal watercraft 20 during certain activities, such as fishing. It is to be noted that the rear seat portion 76 can be connected to the pedestal 72 of the personal watercraft 20 as shown in FIGS. 1 and 2 or to the seat support 122 as shown in FIGS. 3 and 4.

Figure 22:
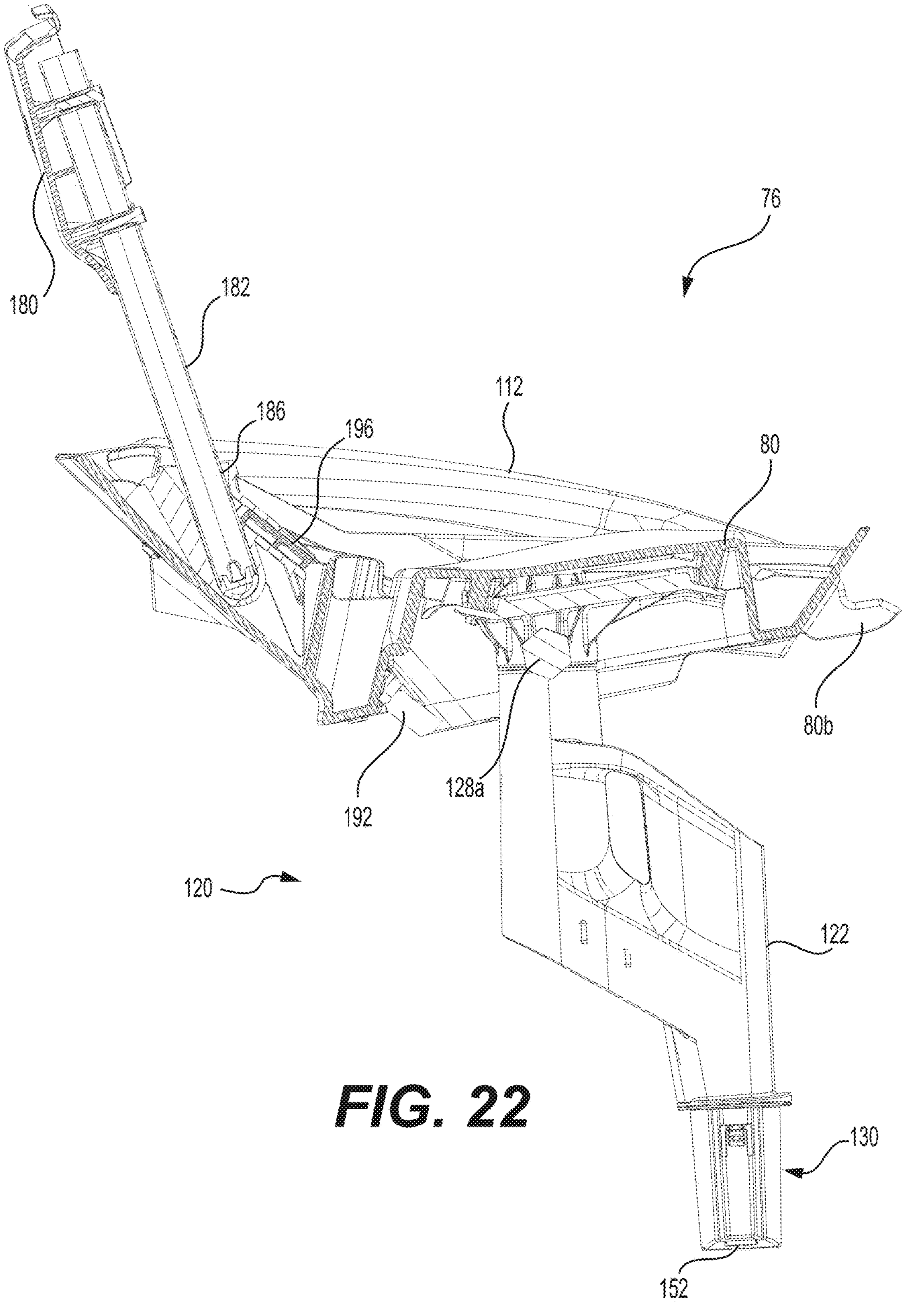
FIG. 22 is a cross-sectional view of the raised seating system of FIG. 17 taken along cross-section line 22-22 of FIG. 21.

Referring to FIGS. 7 to 12, the seat support 122 has an upper portion 124 that is selectively connected to the base 80 of the rear seat portion 76 after the rear seat portion 76 is disconnected from the pedestal 72. Referring to FIG. 6, the base 80 defines a seat support aperture 126 adapted to receive the upper portion 124 of the seat support 122. When the rear seat portion 76 is connected to the seat support 122, the rear seat portion 76 is pivotable about a generally vertically extending pivot axis 128 (FIG. 4), offering even more flexibility to as user of the watercraft 20 seated on the raised rear seat portion 76. A bolt **128*a* (FIGS. 6 and 22) is provided on the rear seat portion 76 and selectively abuts the upper portion 124 of the seat support 122 when connected thereto. When tightened, the bolt 128*a* prevents pivoting of the rear seat portion 76 about the pivot axis 128**.

Figure 10:
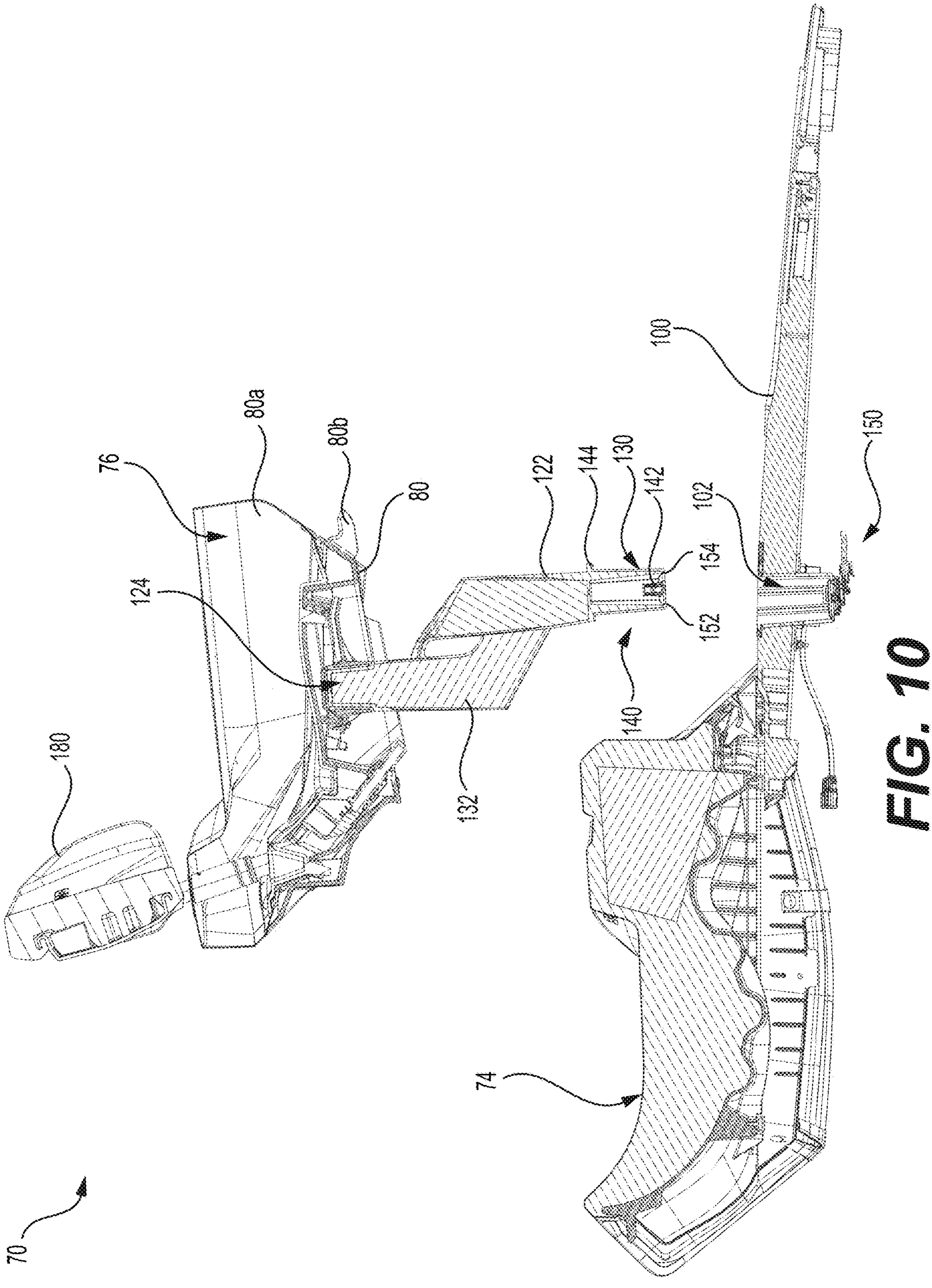
FIG. 10 is a cross-sectional view of the portion of the deck of the personal watercraft, rear seat portion and seat support of FIG. 7 taken along cross-section line 10-10 of FIG. 9.

Referring to FIGS. 3, 4 and 8 to 12, the seat support 122 further has a lower portion 130 connected to the upper portion 124. The lower portion 130 is selectively inserted in the anchor aperture 102 of the deck panel 100 when the rear seat portion 76 is disconnected from the pedestal 72. The lower portion 130 and the upper portion 124 are integrally formed, but could be provided as separate components connected together in other implementations. The upper and lower portion 124, 130 are hollow and at least partially filled with closed-cell foam 132 (FIG. 10). The foam 132 limits the entry of water in the upper and lower portions 124, 130, making the seat support 122 buoyant should it be dropped in water. When not in use, the seat support 122 is sized to be stowed in the storage bin 40 of the personal watercraft 20 (FIG. 2).

Figure 11:
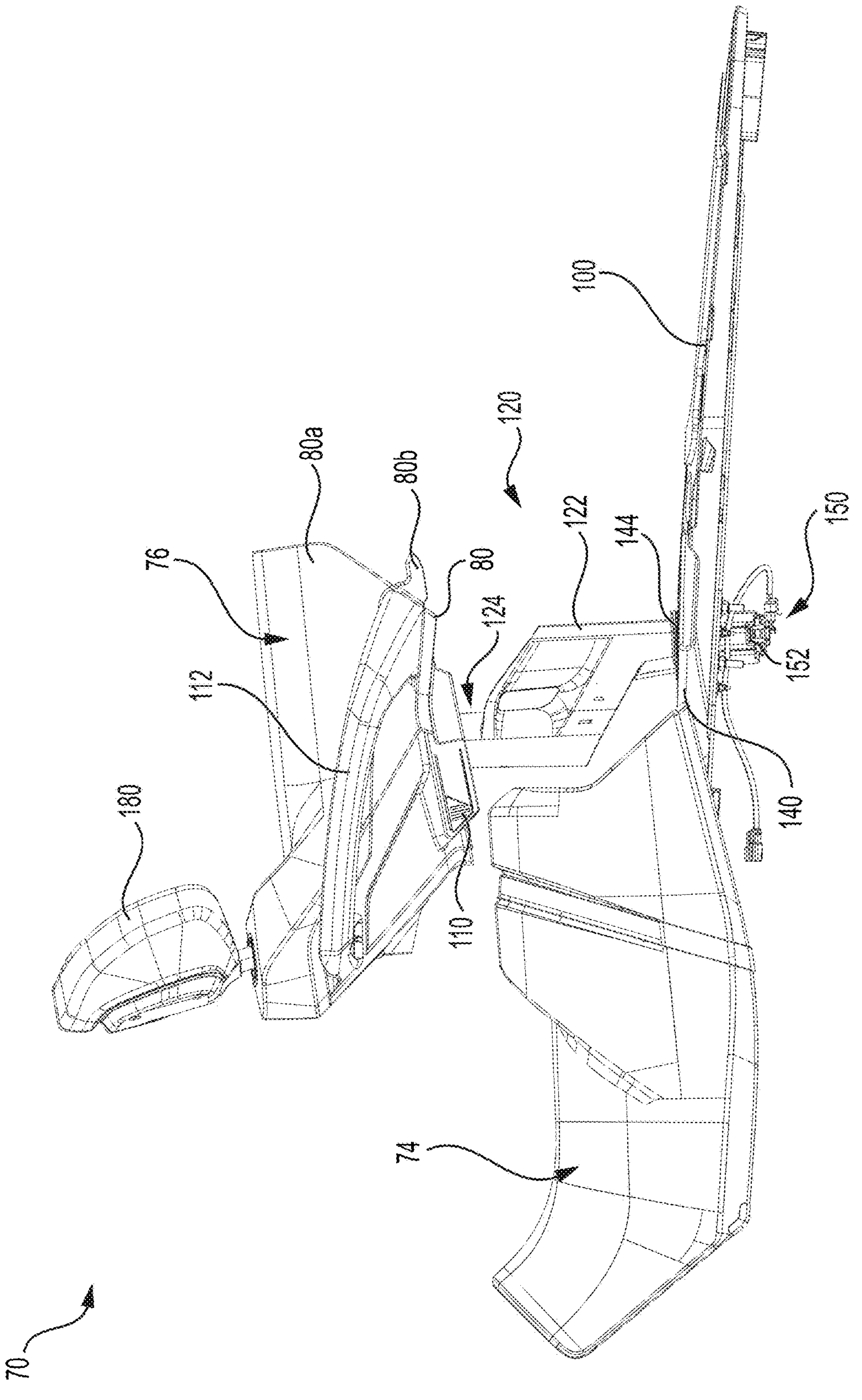
FIG. 11 is a left side elevation view of the portion of the deck of the personal watercraft, rear seat portion and seat support of FIG. 7, with the seat support selectively connected to the deck in a forward orientation.

Still referring to FIGS. 3, 4 and 8 to 12, the lower portion 130 of the seat support 122 includes a retaining system 140 for securing the seat support 122 to the deck panel 100. The retaining system 140 includes left and right tabs 142 adapted to selectively engage the deck panel 100. When the seat support 122 is pulled upwardly, the tabs 142 are pressed inwardly and the seat support 122 can be pulled out of the anchor aperture 102. Other retaining systems 140 could be used in other implementations. The lower portion 130 of the seat support 122 also includes a flange 144 for abutting a region of the top face of the deck panel 100 surrounding the anchor aperture 102 (FIGS. 3 and 11).

Figure 12:
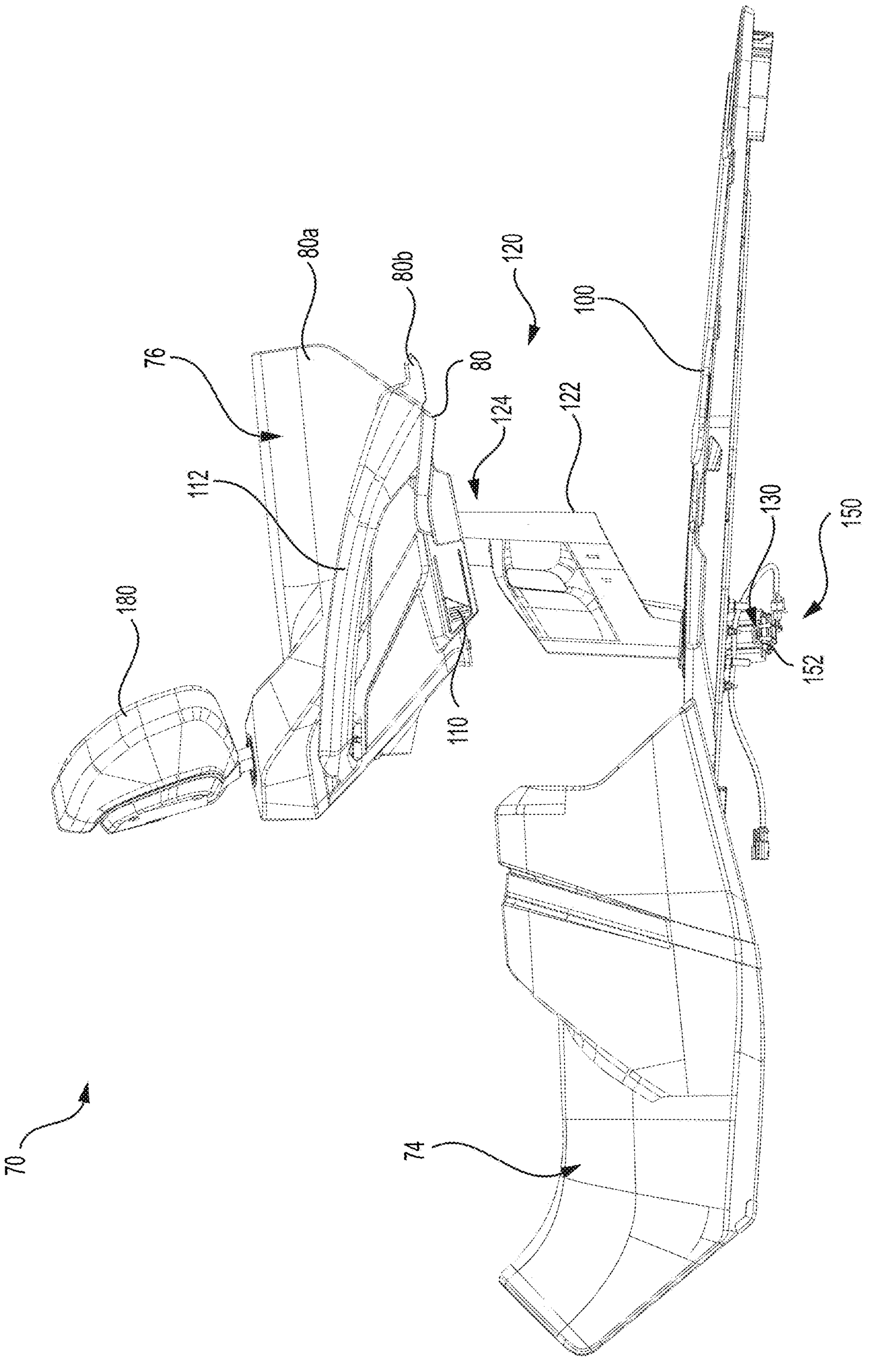
FIG. 12 is a left side elevation view of the portion of the deck of the personal watercraft, rear seat portion and seat support of FIG. 7, with the seat support selectively connected to the deck in a rearward orientation.

Referring to FIGS. 11 and 12, it is to be noted that the lower portion 130 is selectively inserted in the anchor aperture 102 in either one of forward orientation (FIG. 11) where the upper portion 124 extends longitudinally forward of the lower portion 130, and a rearward orientation (FIG. 12) where the upper portion 124 extends longitudinally rearward of the lower portion 130. The user can thus select the orientation of the seat support 122 when using the raised seating system 120. The longitudinal position of the rear seat portion 76 can thus be selected by the user when the rear seat portion 76 is connected to the seat support 122. The user can thus select how far the rear seat portion 76 is from the transom 94 of the personal watercraft 20.

Referring to FIGS. 2 and 8 to 12, the raised seating system 120 further includes a sensor 150 connected to the deck panel 100 and located below the anchor aperture 102. The sensor 150 is in operative communication with the motor control unit 38, as shown in FIG. 2. The sensor 150 detects the presence of the lower portion 130 of the seat support 122 within the anchor aperture 102 when connected to the deck panel 100, and in response to the sensor 150 detecting the presence of the seat support 122, the motor control unit 38 limits at least one of the parameters associated with the motor 36. In the present implementation, when the sensor 150 detects the presence of the seat support 122, the sensor 150 sends a signal to the motor control unit 38 and the motor control unit 38 limits the speed of the personal watercraft 20. For example, the speed of the personal watercraft 20 could be limited to a predetermined speed suitable for trolling and moving the watercraft 20 around a fishing spot. In other implementations, the motor control unit 38 could limit other parameters associated with the motor 36, such as a rate of acceleration of the personal watercraft 20, the motor torque and the motor speed, the parameters being considered alone or in combination, to limit the performance of the personal watercraft 20. Additionally, in the present embodiment, the sensor 150 is also in operative communication with the instrument cluster 64 so that when the sensor 150 detects the presence of the seat support 122, the sensor 150 sends a signal to the instrument cluster 64, which displays a notification to indicate that the motor control unit 38 has detected the presence of the seat support 122, and is limiting the speed of the personal watercraft 20. It is understood that in other embodiments, the notification could indicate that the motor control unit 38 is limiting another one of the parameters associated with the motor 36 and/or simply indicating that the seat support 122 is being detected.

In the present implementation, the lower portion 130 of the seat support 122 includes a magnet 152 (FIGS. 10 to 12). More particularly, the magnet 152 is connected to a bottom wall 154 of the seat support 122 (FIG. 10). The magnet 152 could be connected elsewhere in other implementations. The sensor 150 is a Hall-effect sensor operable for detecting the magnet 152 in response to the lower portion 130 being inserted in the anchor aperture 102. In other words, the sensor 150 detects the presence of the magnet 152 when the lower portion 130 is inserted in the anchor aperture 102, and notably when the lower portion 130 is fully inserted in the anchor aperture 102 with the tabs 142 engaging the deck panel 100 and the flange 144 abutting the top face of the deck panel 100.

It is contemplated that other types of sensor 150 could be used in other implementations and be operable for detecting the presence of the seat support 122 in response to being connected to the deck panel 100 and sending an associated signal to the motor control unit 38. In some implementations, it is contemplated that the sensor 150 could be a pressure switch capable of detecting the presence of the seat support 122 when pressed in response to the seat support 122 being connected to the deck panel 100. In other implementations, it is contemplated that the sensor 150 could be an electrical switch capable of detecting the presence of the seat support 122 as an electrical circuit is closed in response to the seat support 122 being connected to the deck panel 100. Other devices, such as, and not limited to, contact switches, limit switches, strain gauges, near field communication (NFC) sensor, and photoelectric devices could be used as the sensor 150 in other implementations. It is contemplated that the sensor 150 could be a combination of different devices capable of detecting the presence of the seat support 122 in the anchor aperture 102 using different means (ex. electrical contact and photoelectric device). It is also contemplated that the sensor 150 could be connected to the hull 22 and/or the deck 24 in other implementations.

Figure 13:
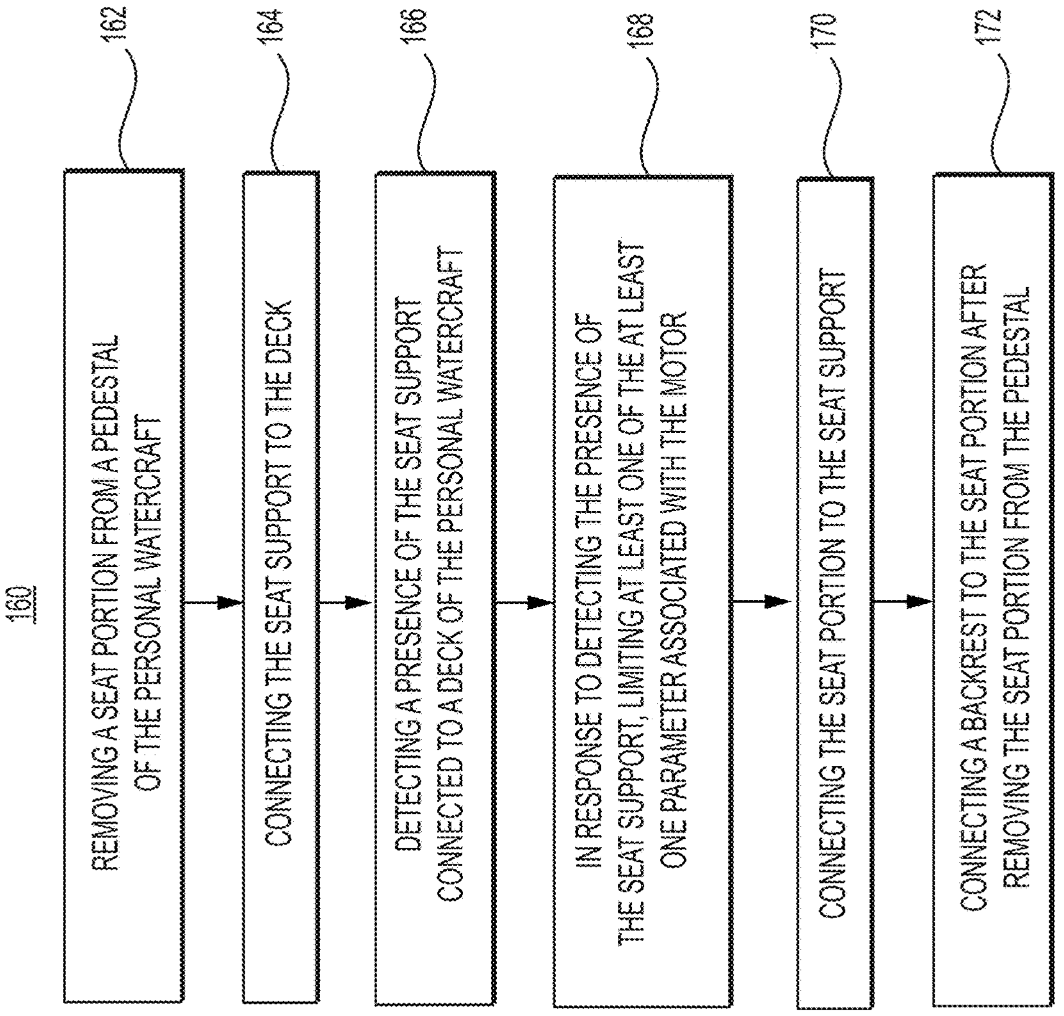
FIG. 13 is a flowchart of a method for adjusting performance of a personal watercraft according to the present technology.
Figure 14:
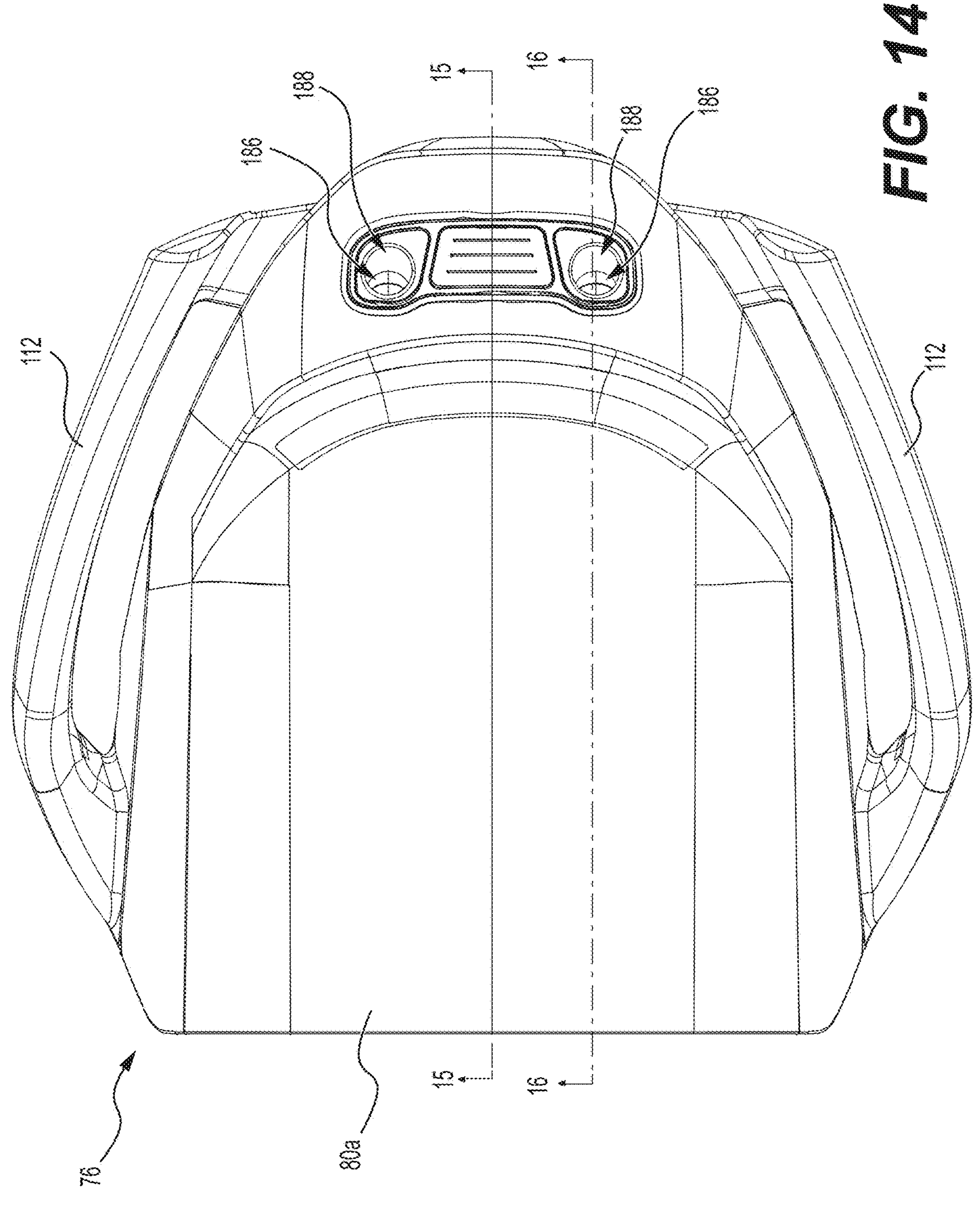
FIG. 14 is a top plan view of the rear seat portion of FIG. 5.
Figure 15:
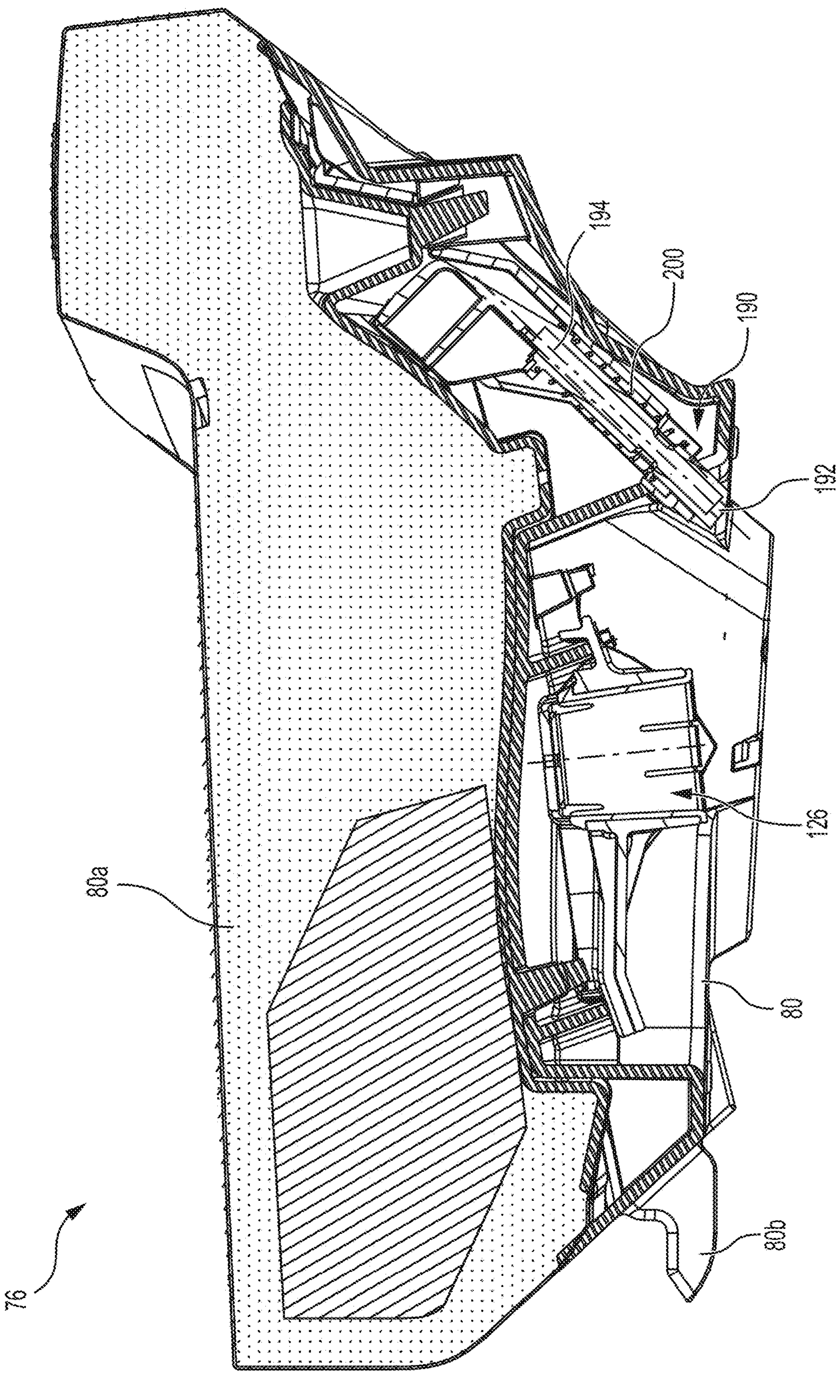
FIG. 15 is a cross-sectional view of the rear seat portion of FIG. 5 taken along cross-section line 15-15 of FIG. 14.

Referring to FIG. 13, a method 160 for adjusting the performance of the personal watercraft 20 will be described with reference to the following illustrative scenario. Initially, the rear seat portion 76 is connected to the deck panel 100 as shown in FIGS. 1 and 2, and the personal watercraft 20 is "on" (i.e. the motor control unit 38 is on). When the user desires to use the raised seating system 120, the user accesses the storage bin 40 and pulls out the seat support 122. At step 162, the user removes the rear seat portion 76 from the pedestal 72 by pressing the buttons 110 and lifting the rear seat portion 76. At step 164, the user connects the seat support 122 to the deck panel 102 by inserting the lower portion 130 in the anchor aperture 102 in the forward or rearward orientation (FIGS. 11 and 12). At step 166, the method 160 includes detecting the presence of the seat support 122 connected to the deck panel 100. The detection step 166 is performed using the sensor 150 described above, and could be performed using different types of sensors 150. At step 168, the method 160 includes limiting at least one of the parameters associated with the motor 36 in response to detecting the presence of the seat support 122. The limiting of the parameter(s) associated with the motor 36, such as the motor speed, the motor torque, the rate of acceleration of the personal watercraft 20 and the speed of the personal watercraft 20, adjusts the performance of the personal watercraft 20 to remain within a predetermined performance range. In the present implementation, when the motor control unit 38 receives the signal from the sensor 150 that the seat support 122 is detected (i.e. the lower portion 130 is about to or is connected to the deck panel 100), the motor control unit 38 limits the speed of the personal watercraft 20. Other parameter(s) could be limited by the motor control unit 38 in other implementations. At step 170, the user connects the rear seat portion 76 to the upper portion 124 of the seat support 122. At step 172, the user connects the backrest 180 to the rear seat portion 76 being raised above the deck panel 100 by the seat support 122. Some steps of the method 160, such as step 172, are optional.

It is to be noted that the steps 166, 168 described above only occur when the personal watercraft 20 is "on" (i.e. when the motor control unit 38 is on). It is also contemplated that should the personal watercraft 20 be "off" initially, the method 160 could be performed in a different order. For example, the user could first remove the rear seat portion 76 from the pedestal 72 (step 162), then connect the seat support 122 to the deck panel 102 (step 164), and connect the rear seat portion 76 to the seat support 122 (step 170). The user could then turn the personal watercraft 20 "on", and the detection step 166 and the limiting step 168 would occur. It is also contemplated that the step 170 of connecting the rear seat portion 76 to the seat support 122 could occur before the step 164. Other orders of the steps of the method 160 are contemplated.

Figure 19:
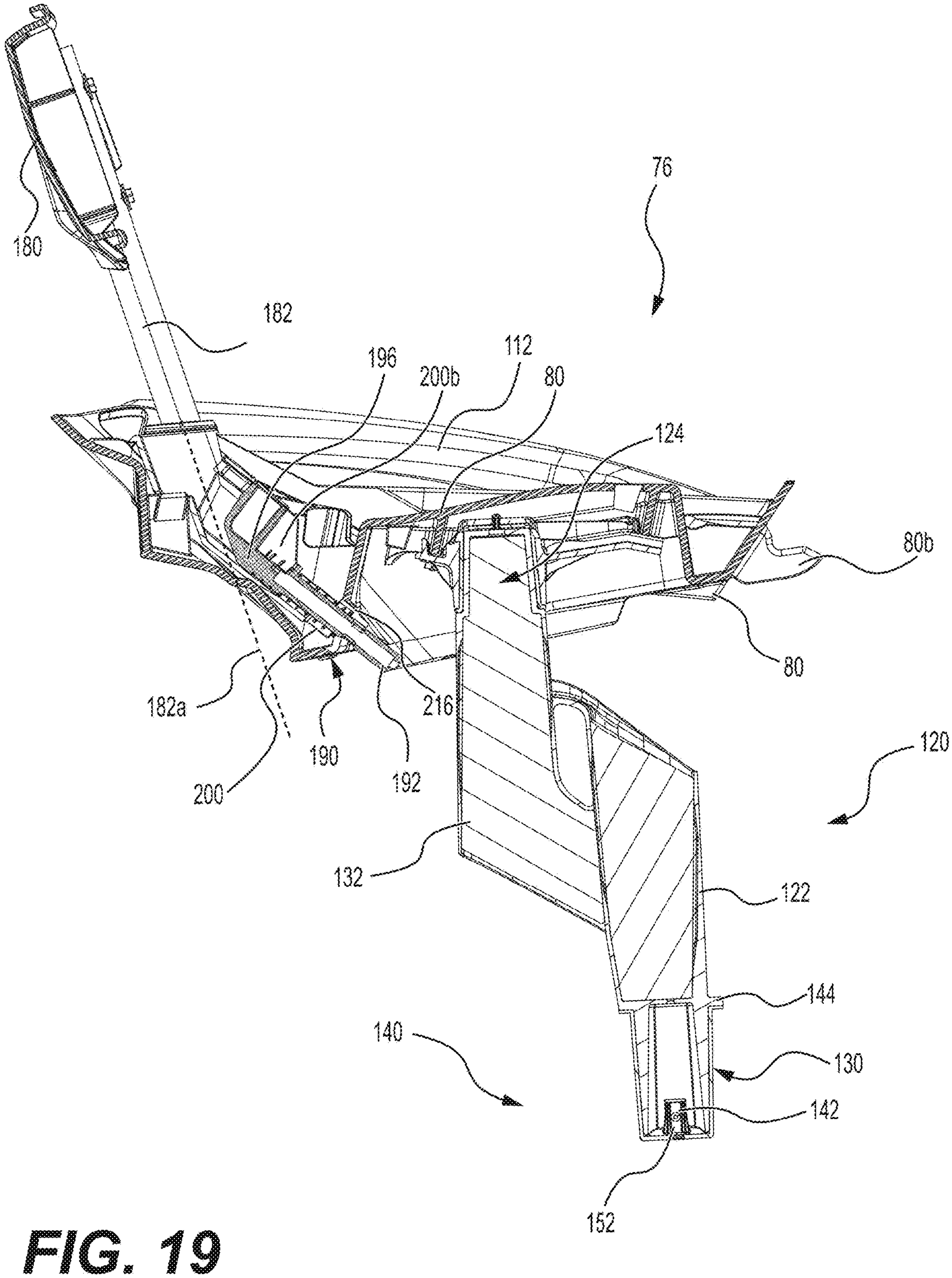
FIG. 19 is a cross-sectional view of the raised seating system of FIG. 3 taken along cross-section line 19-19 of FIG. 18, with the cushion on the backrest also removed.

Referring now to FIGS. 14 to 22, the connection of the backrest 180 to the rear seat portion 76 will be described in more detail. As mentioned above, the raised seating system 120 further includes the backrest 180 that is selectively connected to the rear seat portion 76 when the rear seat portion 76 is connected to the upper portion 124 of the seat support 122. The backrest 180 has two laterally spaced-apart backrest arms 182 each extending along a respective arm axis 182*a* (FIG. 19). The backrest 180 could be provided with only one or more than two backrest arms 182 in other implementations. When not in use, the backrest 180 can be stowed in the storage bin 40 of the personal watercraft 20 (FIG. 2). More particularly, the backrest arms 182 can be secured to a bracket 184 (FIG. 2) located in the storage bin 40 to hold the backrest 180. To connect the backrest 180 to the rear seat portion 76, the backrest arms 182 are received in corresponding channels 186 defined in the base 80 of the rear seat portion 76. Holes 188 are also defined in the cushion 80*a* for receiving the backrest arms 182 and allowing access to the channels 186 from above.

Figure 16:
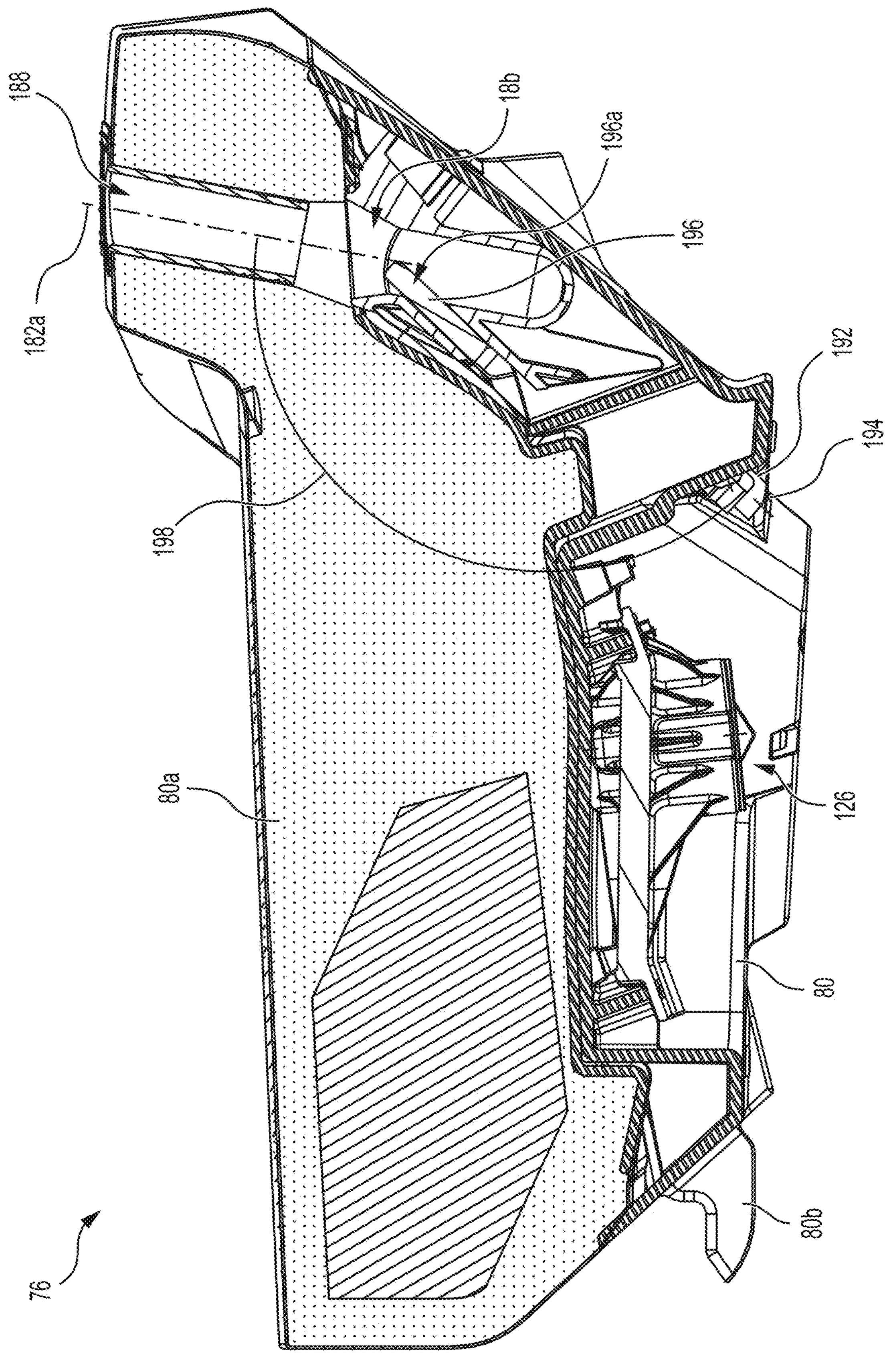
FIG. 16 is a cross-sectional view of the rear seat portion of FIG. 5 taken along cross-section line 16-16 of FIG. 14.
Figure 17:
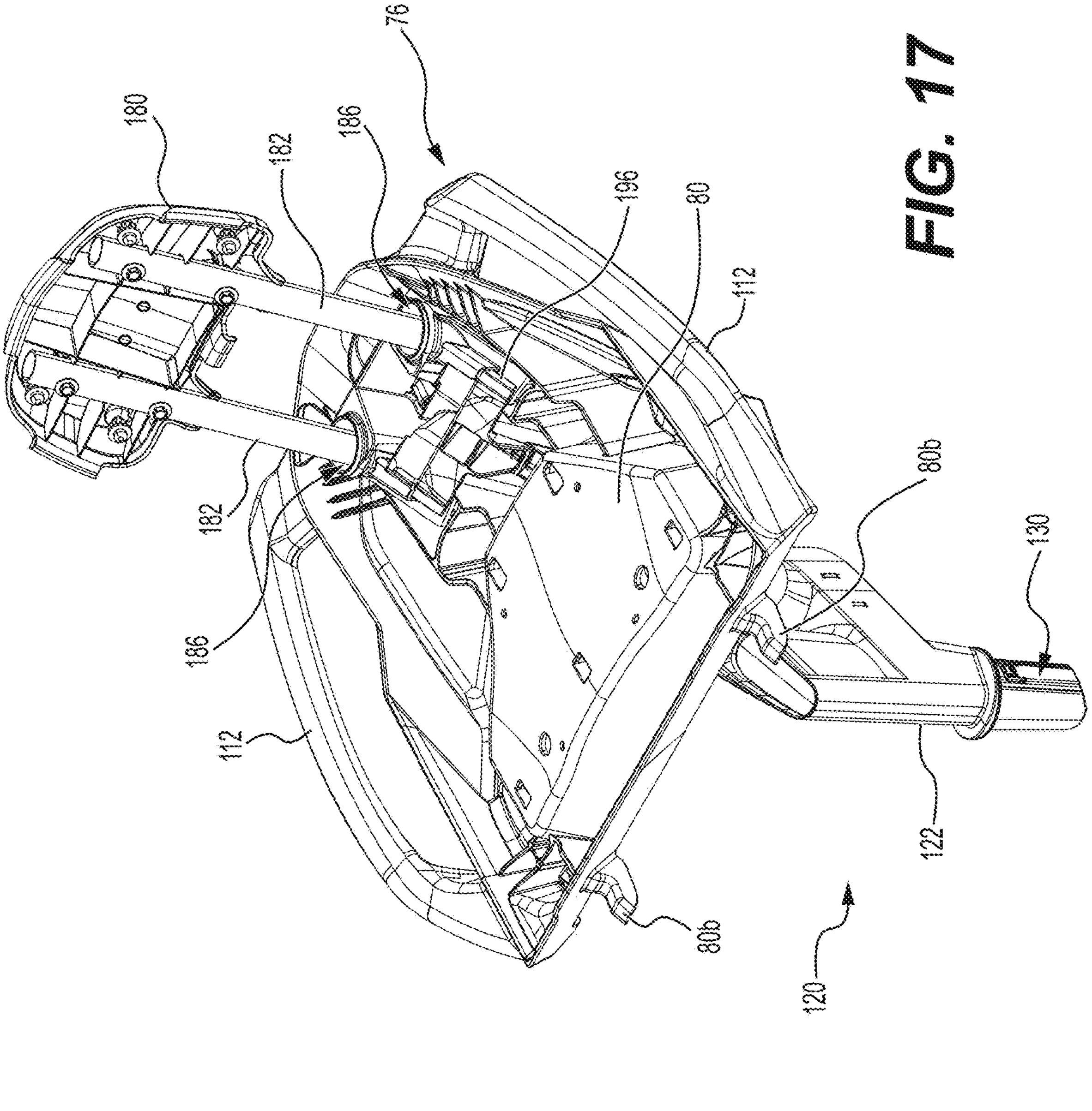
FIG. 17 is a perspective view taken from a top, rear, right side of the raised seating system of FIG. 3, with the cushions on the rear seat portion and of a backrest removed.
Figure 18:
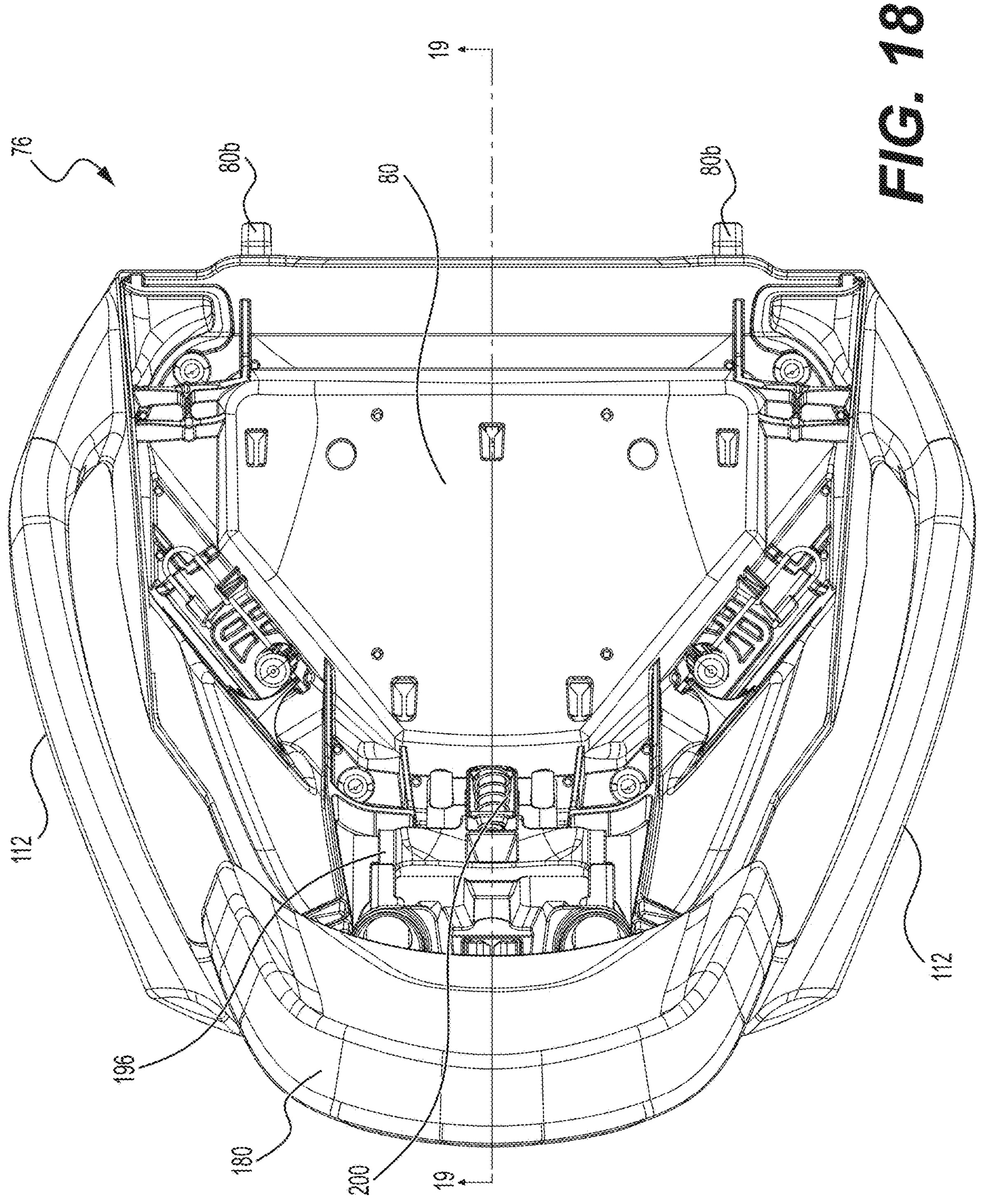
FIG. 18 is a top plan view of the raised seating system of FIG. 3, with the cushion on the rear seat portion removed.

Referring to FIGS. 17 to 22, a blocking system 190 is operatively connected to the base 80 of the rear seat portion 76. The blocking system 190 includes a blocking member 192 slidably received in the base 80. The blocking member 192 is cylindrical and translates along a blocking member axis 194 between a retracted position (FIGS. 15, 16 and 23) and an extended position (FIGS. 19, 20, 22, 24 and 25) that will be described in more detail below. It is contemplated that the blocking member 192 could be shaped otherwise and be movable in a different manner in other implementations (ex. rotatable). The blocking system 190 further includes a transverse member 196 (FIGS. 17, 19 and 20) connected to the blocking member 192. In the present implementation, the blocking member 192 and the transverse member 196 are integrally formed, but could be provided as separate components connected together in other implementations. As best seen in FIG. 16, the transverse member 196 extends in the channels 186 when the blocking member 192 is in the retracted position. More particularly, only the left and right upper portions 196*a* of the transverse member 196 extend in the corresponding left and right channels 186 when the blocking member 192 is in the retracted position. Since the transverse member 196 extends laterally towards the channels 186, the arm axis 182*a* of each backrest arm 182 is laterally offset from the blocking member axis 194, as can be understood from FIG. 20.

It is also to be noted that an angle 198 (FIG. 16) defined between the blocking member axis 194 and the arm axis 182*a* of each backrest arm 182 is about 150 degrees. It is contemplated that the angle 198 could be comprised between 120 and 170 degrees in other implementations. Other angles are also contemplated.

Figure 20:
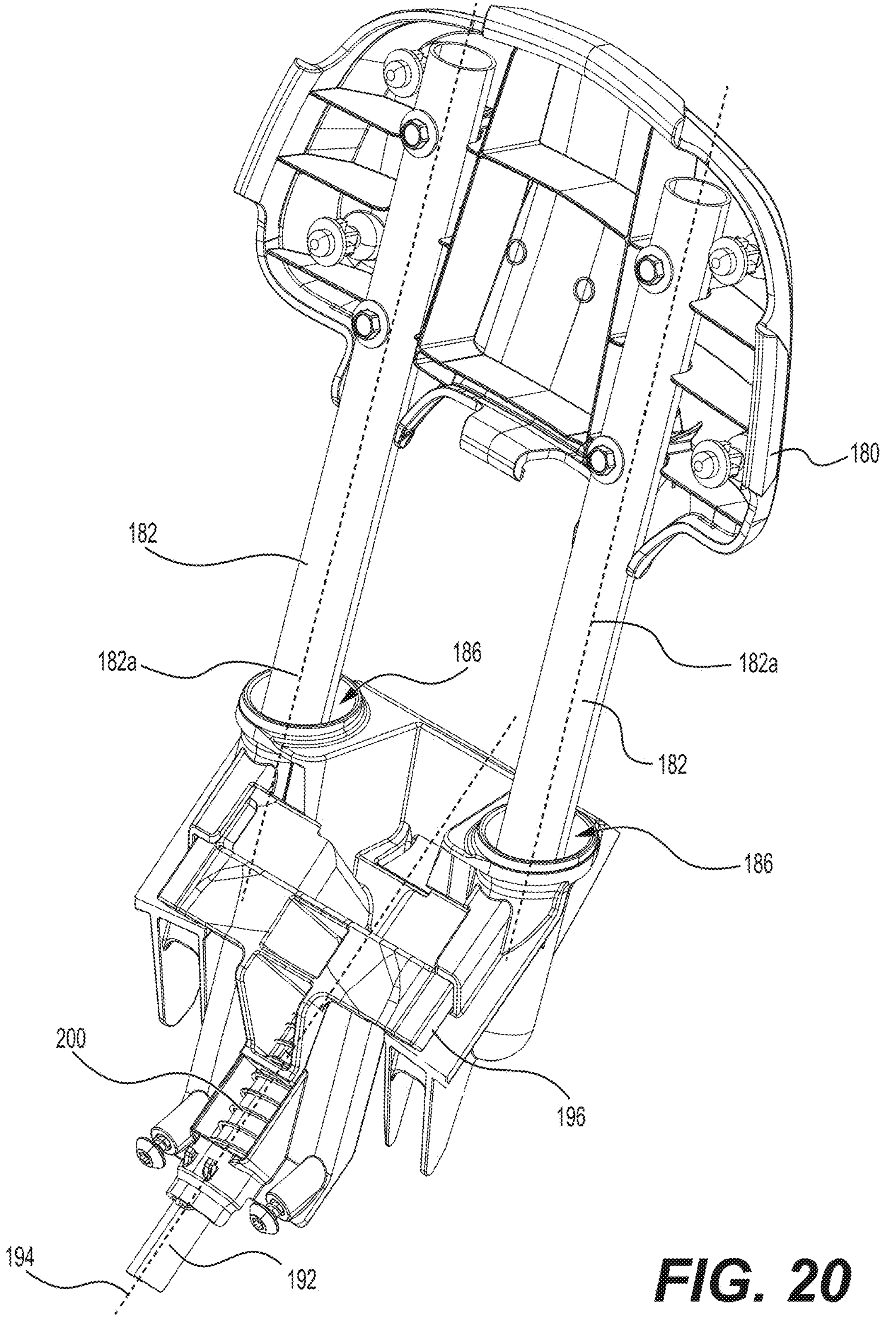
FIG. 20 is a perspective view taken from a top, rear, right side of the backrest of FIG. 17 and of a blocking system, with a blocking member of the blocking system being in an extended position.
Figure 21:
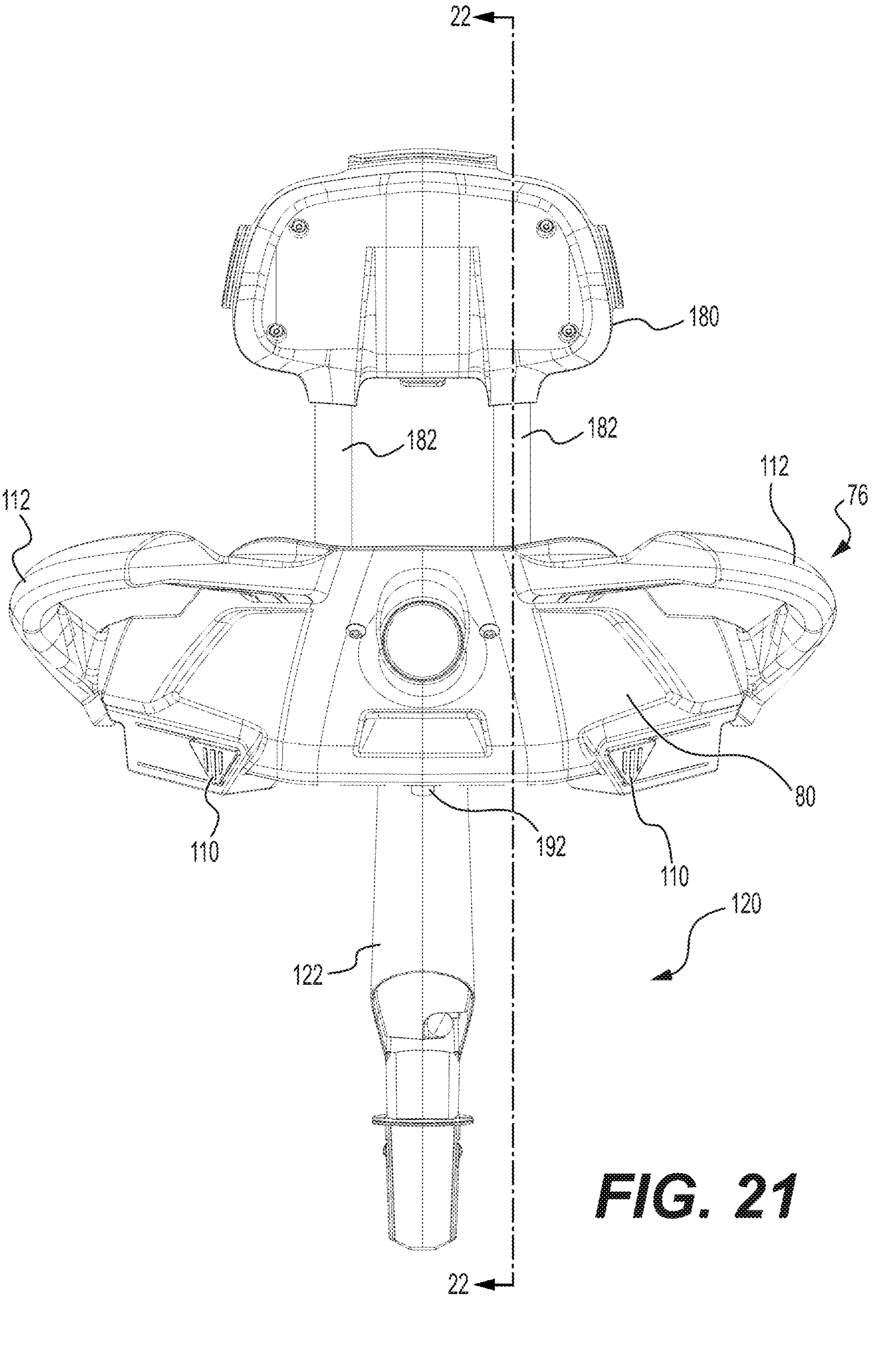
FIG. 21 is a front elevation view of the raised seating system of FIG. 17.

The blocking system 190 further has a spring 200 (FIGS. 19 and 20) connected between the base 80 and the transverse member 196. More particularly, the spring 200 extends around the blocking member 192 and abuts the base 80 at a bottom end 200*a* thereof, and abuts the transverse member 196 at a top end thereof. The spring 200 biases the blocking member 192 toward the retracted position. When the backrest arms 182 are inserted in the channels 186, the left and right upper portions 196*a* of the transverse member 196 are pushed downwardly and forwardly along the blocking member axis 194 and the blocking member 192 is moved toward the extended position as the spring 200 compresses, as shown in FIG. 20. It is contemplated that the spring 200 could be omitted in some implementations. In such implementations, the blocking member 192 would be pushed toward the retracted position when the rear seat portion 76, without the backrest 180 being connected thereto, is connected to the deck panel 100.

Figure 23:
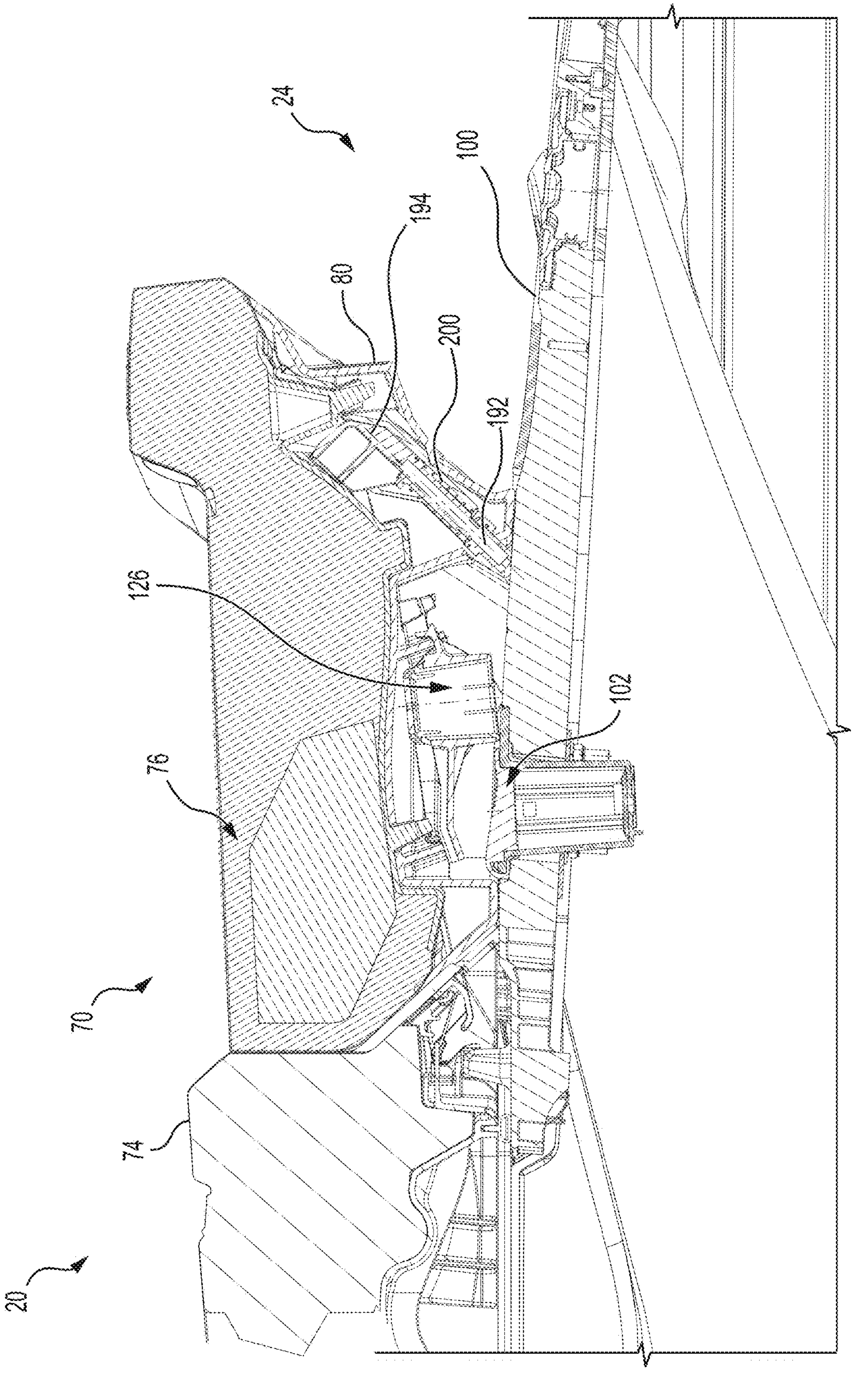
FIG. 23 is a close-up, longitudinal cross-sectional view taken from a left side of the personal watercraft of FIG. 1, with the rear seat portion connected to the deck.

The operation of the blocking system 190 will now be described. The blocking system 190 has a retracted configuration (FIGS. 15, 16 and 23) permitting connection of the rear seat portion 76 to the deck panel 100 in response to the backrest 180 being disconnected from the rear seat portion 76. When the blocking system 190 is in the retracted configuration, the blocking member 192 is biased in the retracted position by the spring 200. When in the retracted position, the blocking member 192 is retracted in the base 80 of the rear seat portion 76 (best seen in FIGS. 15 and 23), which permits the connection of the rear seat portion 76 to the deck panel 100. In other words, when the backrest 180 is disconnected from the rear seat portion 76, the blocking member 192 is biased in the retracted position by the spring 200, and the connection of the rear seat portion 76 to the deck panel 100 is permitted, as shown in FIG. 23.

The blocking system 190 further has an extended configuration (FIGS. 19 to 22, 24 and 25) preventing connection of the rear seat portion 76 to the deck panel 100 in response to the backrest 180 being connected to the rear seat portion 76. When the backrest 180 is connected to the rear seat portion 76, the blocking system 190 is in the extended configuration, which places the blocking member 192 in the extended position. When in the extended position, the blocking member 192 extends outward of the base 80 of the rear seat portion 76 for abutting the deck panel 100 and preventing the rear seat portion 76 from being selectively connected to the deck panel 100. More particularly, when the backrest arms 182 are received in the channels 186, the backrest arms 182 push the transverse member 196 downwardly, the spring 200 is compressed, and the blocking member 192 is translated towards the extended position. In other words, when the backrest 180 is connected to the rear seat portion 76, the blocking member 192 is in the extended position, and the connection of the rear seat portion 76 to the deck 24 is prevented.

Figure 24:
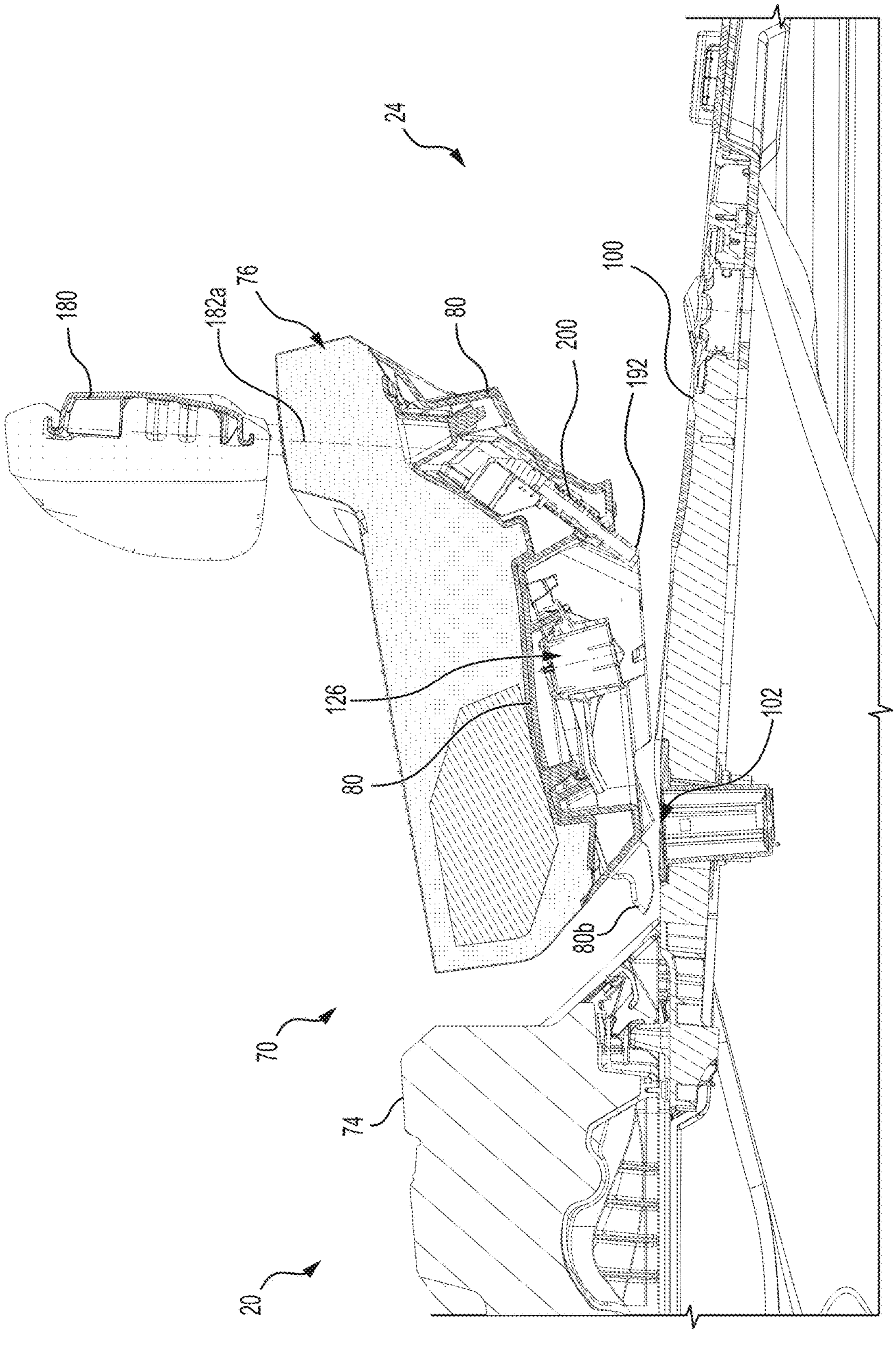
FIG. 24 is a close-up, longitudinal cross-sectional view taken from a left side of the personal watercraft of FIG. 1, with the rear seat portion having the backrest connected thereto and with the rear seat portion being disposed above the deck for attempting connection thereto.
Figure 25:
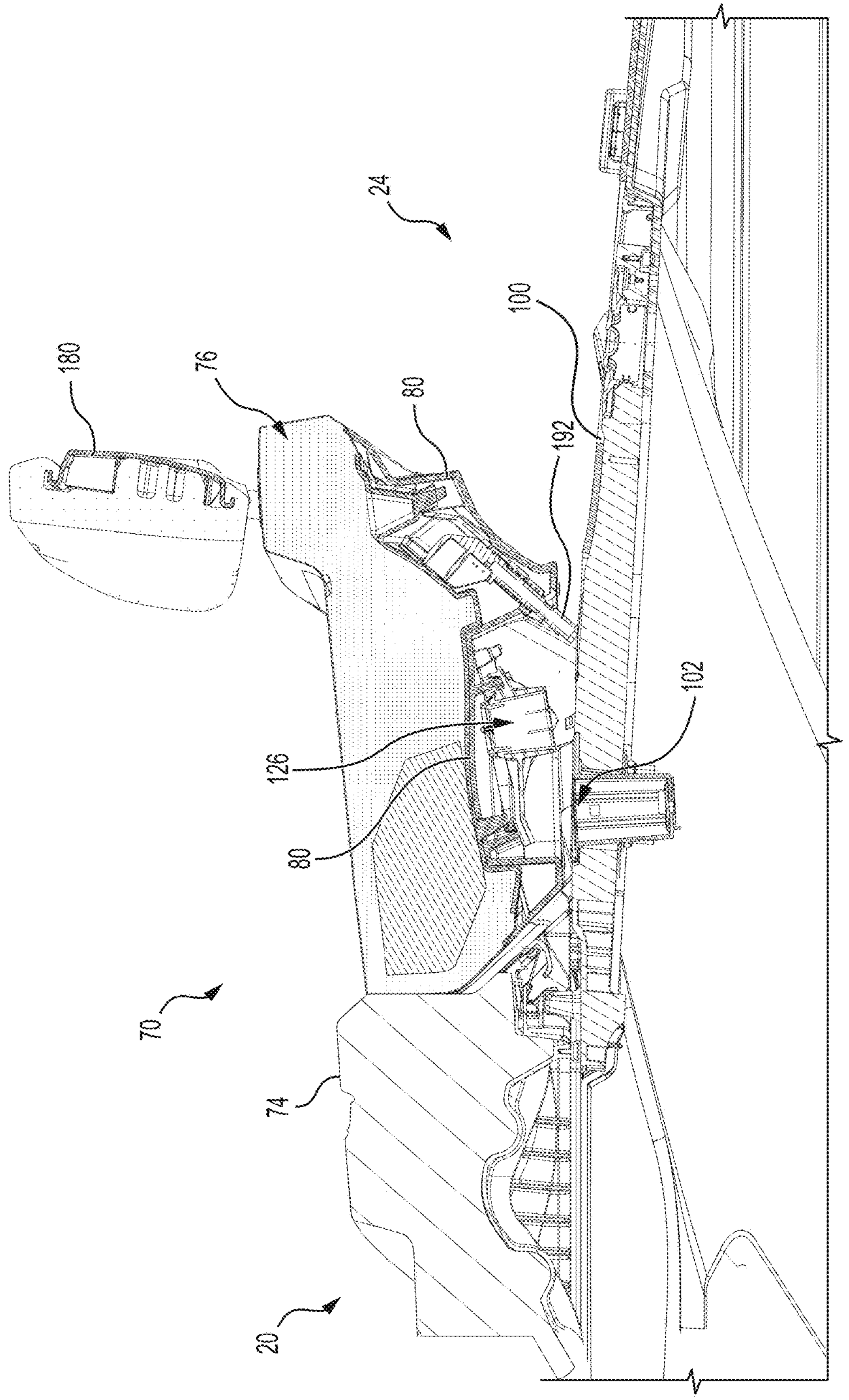
FIG. 25 is a close-up, longitudinal cross-sectional view taken from a left side of the personal watercraft of FIG. 1, with the rear seat portion having the backrest connected thereto and with the rear seat portion being prevented from connecting to the deck by the blocking system.

As best seen in FIGS. 24 and 25, when the blocking member 192 is in the extended position, the blocking member 192 abuts the top face of the deck panel 100 when the base 80 engages the deck panel 100, and the latches 106 of the base 80 cannot connect to the corresponding pegs 104, thus preventing the connection of the rear seat portion 76 to the deck panel 100 when the backrest 180 is connected to the rear seat portion 76. In order to connect the rear seat portion 76 to the deck panel 100, the backrest 180 is disconnected from the rear seat portion 76, causing the spring 200 to bias the blocking member 192 toward the retracted position (FIG. 23) and as the blocking member 192 is no longer extending outward of the base 80, the connection of the rear seat portion 76 to the deck panel 100 is permitted. The backrest 180 can then be stowed in the storage bin 40 when not in use.

Therefore, when the rear seat portion 76 is connected to the deck panel 100, the blocking system 190 is in the retracted configuration (i.e., the blocking member 192 is in the retracted position). Upon connection of the rear seat portion 76 to the deck panel 100, the blocking member 192 cannot move toward the extended position, as movement thereof is limited by abutment with the top face of the deck panel 100. As a result, when the rear seat portion 76 is connected to the deck panel 100, the left and right upper portions **196*a* of the transverse member 196, which extend in the corresponding left and right channels 186, prevent the backrest 180 from being securely connected to the rear seat portion 76. More precisely, when the rear seat portion 76 is connected to the deck panel 100, the backrest arms 182 can be inserted in the holes 188 defined in the cushion 80*a*, until a bottom of the backrest arms 182 abut the left and right upper portions 196*a* of the transverse member 196. As the left and right upper portions 196*a* extend within the channels 186 of the base 80 (shown in FIG. 16), the backrest arms 182 are only received within the cushion 80*a*, and due to the resilient nature of the cushion 80*a*, the backrest 180 is not securely connected to the rear seat portion 76**.

Modifications and improvements to the above-described implementation of the present technology may become apparent to those skilled in the art. The foregoing description is intended to be exemplary rather than limiting. The scope of the present technology is therefore intended to be limited solely by the scope of the appended claims.

What is claimed is:

1. A personal watercraft comprising:
- a hull;
- a deck disposed on the hull;
- a seat assembly supported on the deck, the seat assembly including:
  - a seat portion selectively connected to the deck;
  - a backrest selectively connected to the seat portion; and
  - a blocking system operatively connected to the seat portion, the blocking system having:
    - a first configuration permitting connection of the seat portion to the deck in response to the backrest being disconnected from the seat portion, and
    - a second configuration preventing connection of the seat portion to the deck in response to the backrest being connected to the seat portion.

2. The personal watercraft of claim 1, wherein the seat portion includes a base and a cushion disposed on top of the base.

3. The personal watercraft of claim 2, wherein:
- one of the deck and the base has at least one peg;
- another one of the deck and the base has at least one latch; and
- the at least one latch is configured to selectively connect to the at least one peg for connecting the seat portion to the deck.

4. The personal watercraft of claim 1, wherein the blocking system includes a blocking member,
- in response to the blocking system being in the first configuration, the blocking member is in a first position permitting the connection of the seat portion to the deck, and
- in response to the blocking system being in the second configuration, the blocking member is in a second position preventing the connection of the seat portion to the deck.

5. The personal watercraft of claim 2, wherein the blocking system includes a blocking member,
- in response to the blocking system being in the first configuration, the blocking member is in a first position permitting the connection of the seat portion to the deck, and
- in response to the blocking system being in the second configuration, the blocking member is in a second position preventing the connection of the seat portion to the deck.

6. The personal watercraft of claim 5, wherein, in the first position, the blocking member is retracted in the base of the seat portion.

7. The personal watercraft of claim 5, wherein, in the second position, the blocking member extends outward of the base of the seat portion for abutting the deck and preventing the seat portion from being selectively connected to the deck.

8. The personal watercraft of claim 5, wherein the backrest has at least one backrest arm, and the base includes at least one channel adapted for receiving the at least one backrest arm therein, the at least one backrest arm pushing the blocking member towards the second position when received in the at least one channel.

9. The personal watercraft of claim 8, wherein the blocking system further includes a transverse member connected to the blocking member, the transverse member extending in the at least one channel when the blocking member is in the first position.

* * * * *